United States Patent
Lessing et al.

(10) Patent No.: US 8,131,577 B2
(45) Date of Patent: Mar. 6, 2012

(54) SYSTEM AND METHOD FOR CAPTURING AND STORING QUALITY FEEDBACK INFORMATION IN A RELATIONAL DATABASE SYSTEM

(75) Inventors: Pieter Lessing, Los Angeles, CA (US);
Dennis Jeng, Yorba Linda, CA (US);
Mark Crosby, Venice, CA (US)

(73) Assignee: Teradata US, Inc., Dayton, OH (US)

( * ) Notice: Subject to any disclaimer, the term of this patent is extended or adjusted under 35 U.S.C. 154(b) by 1080 days.

(21) Appl. No.: 11/958,705

(22) Filed: Dec. 18, 2007

(65) Prior Publication Data
US 2009/0157749 A1   Jun. 18, 2009

(51) Int. Cl.
*G06F 17/60* (2006.01)

(52) U.S. Cl. ...................................... 705/7.11

(58) Field of Classification Search .................... 705/10, 705/7.11
See application file for complete search history.

(56) References Cited

U.S. PATENT DOCUMENTS

| | | | |
|---|---|---|---|
| 5,930,764 A * | 7/1999 | Melchione et al. | 705/7.29 |
| 6,236,990 B1 * | 5/2001 | Geller et al. | 1/1 |
| 7,089,199 B2 * | 8/2006 | Perkowski | 705/26.81 |
| 7,454,433 B2 * | 11/2008 | Ebert | 1/1 |
| 8,019,656 B2 * | 9/2011 | Baran et al. | 705/26.7 |
| 2002/0052774 A1 * | 5/2002 | Parker et al. | 705/10 |
| 2008/0097769 A1 * | 4/2008 | Galvin et al. | 705/1 |

* cited by examiner

*Primary Examiner* — Romain Jeanty
(74) *Attorney, Agent, or Firm* — James Stover

(57) ABSTRACT

A computer implemented method of and system for capturing, storing and organizing quality feedback information associated with products sold by a retail enterprise. The quality feedback information is stored and organized within a relational database in accordance with a logical data model comprising a plurality of entities and relationships defining the manner in which quality feedback information is stored and organized within the relational database. The relational database, populated with quality feedback information, provides the retail enterprise with the means to analyze and improve retail operations, to better manage store inventory, and more efficiently manage product sales and returns.

12 Claims, 16 Drawing Sheets

SYSTEM AND METHOD FOR CAPTURING AND STORING QUALITY FEEDBACK INFORMATION IN A RELATIONAL DATABASE SYSTEM

CROSS REFERENCE TO RELATED APPLICATIONS

This application claims priority under 35 U.S.C. §119(e) to the following co-pending and commonly-assigned patent application, which is incorporated herein by reference:

Provisional Application Ser. No. 61/003,191, entitled "TERADATA RETAIL LOGICAL DATA MODEL 5.01," filed on Nov. 14, 2007, by Pieter Lessing, Dennis Jeng, and Mark Crosby.

This application is related to the following co-pending and commonly-assigned patent applications, which are incorporated by reference herein:

application Ser. No. 10/016,899, entitled "SYSTEM AND METHOD FOR CAPTURING AND STORING INFORMATION CONCERNING SHOPPERS INTERACTIONS AND TRANSACTIONS WITH AN E-BUSINESS RETAILER", filed on Dec. 14, 2001, by Kim Nguyen-Hargett and Pieter Lessing;

application Ser. No. 10/017,146, entitled "SYSTEM AND METHOD FOR CAPTURING AND STORING INFORMATION CONCERNING RETAIL STORE OPERATIONS," filed Dec. 14, 2001, by Kim Nguyen-Hargett and Pieter Lessing;

application Ser. No. 10/190,099, entitled "SYSTEM AND METHOD FOR CAPTURING AND STORING FINANCIAL MANAGEMENT INFORMATION," filed on Jul. 3, 2002 by Sreedhar Srikant, William S. Black, Scott Kilmo, Karen Papierniak and James W. Smith; and application Ser. No. 11/444,047, entitled "SYSTEM AND METHOD FOR CAPTURING AND STORING RFID/SERIALIZED ITEM TRACKING INFORMATION IN A RELATIONAL DATABASE SYSTEM," filed on May 31, 2006, by Pieter Lessing, Dennis Jeng, Mark Crosby and Sreedhar Srikant.

FIELD OF THE INVENTION

The present invention relates generally to Data Warehouse solutions, and more particularly, to systems and methods for capturing, storing and using detailed data on store operations for a Retail Business. Still more particularly, the present invention is related to a logical data model for storing and organizing quality feedback information within a Retail Business data warehouse system.

BACKGROUND OF THE INVENTION

Teradata Corporation has developed a data warehouse solution including a comprehensive suite of analytical and operational applications that captures, organizes and advances the use of high-value business information within a Retail Business. An objective of Teradata Corporation's retail data warehouse solution is to enable retail management to easily access and analyze information that is critical to the operation of retail outlets.

The retail data warehouse solution has been improved to enable the capturing of quality feedback information for products and services sold by the retail enterprise. Maintaining this information in a data warehouse provides the retail enterprise with the ability to analyze and improve supply chain operations, to better manage store inventory, and more efficiently manage product sales and returns.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein.

BEST MODE FOR CARRYING OUT THE INVENTION

Figure 1:
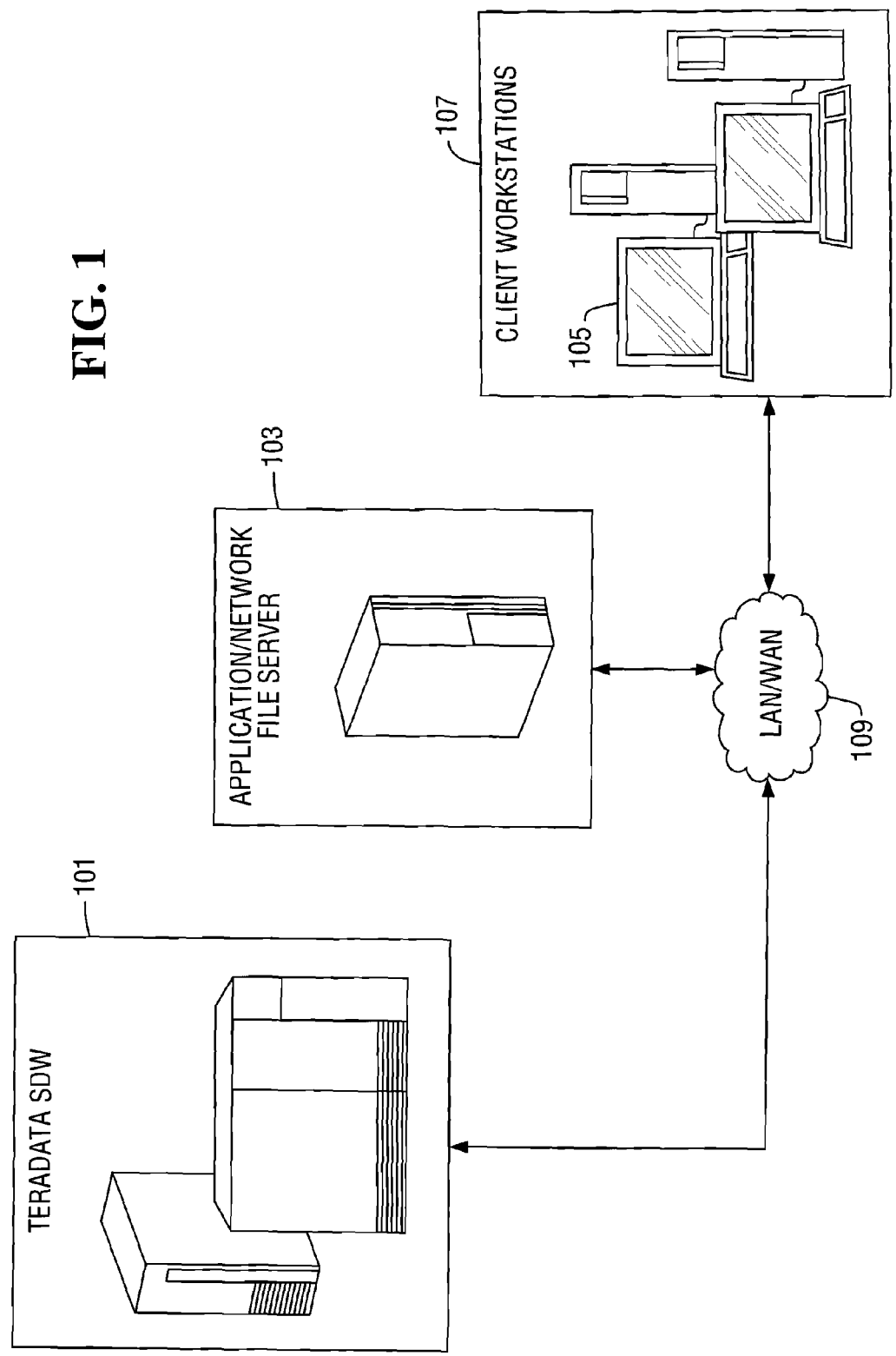
FIG. 1 provides an overview of the hardware components of a data warehouse system.

FIG. 1 provides an overview of the hardware required for a data warehouse solution. The basic components consist of a Teradata Corporation Teradata Scalable Data Warehouse 101, an administrative server 103, and client and administrative workstations 105 and 107, respectively. The components communicate with each other through a Local Area Network (LAN) or Wide Area Network (WAN), identified by reference numeral 109.

Figure 2:
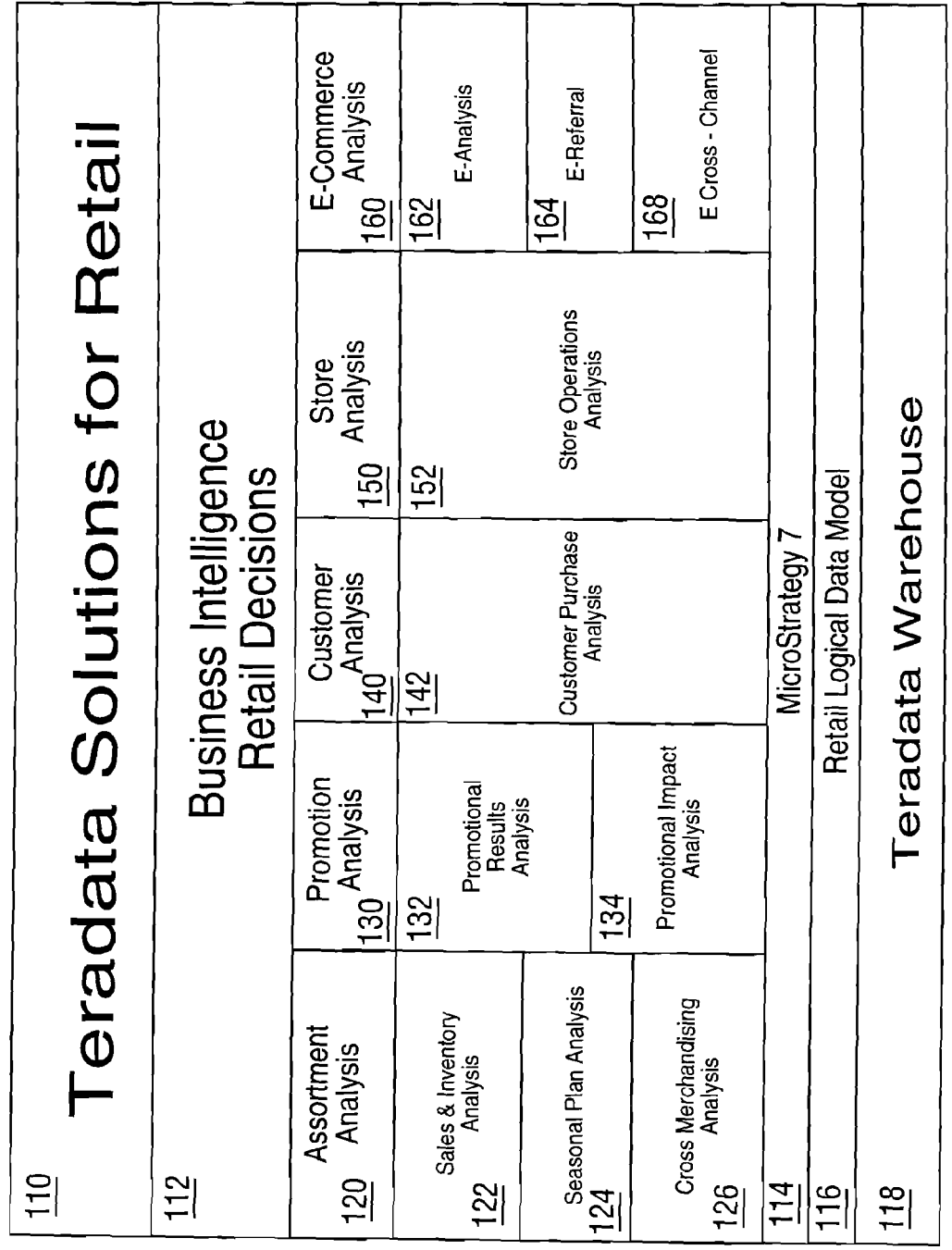
FIG. 2 is a high level illustration of the Teradata Solutions for Retail data warehouse solution and included analytical and operational applications in accordance with the present invention.

A retail business customer-centric warehouse is established on the Teradata Scalable Data Warehouse 101 as defined by the Retail Logical Data Model, described below. The application server 103 supports retail analytic and operational applications, such as Teradata Corporation's Teradata Solutions for Retail suite of retail business applications, illustrated in FIG. 2.

The Teradata Solutions for Retail suite of retail business applications comprises several analytic applications built on a common data model 116, leveraging a single source of data 118 across all departments. The application suite includes the following application members: Assortment Analysis 120, Promotion Analysis 130, Customer Analysis 140, Store Analysis 150 and E-Commerce Analysis 160.

Assortment Analysis (120). The Assortment Analysis application is the foundation for basic sales and inventory reporting; monitoring of sales trends by geography, product and product trait. Beyond basic reporting, functionality includes assortment planning and allocation analysis; additional view of seasonal planning and additional detail on vendor performance measures. Also provides advanced analysis of assortment based on customer segment preferences using analysis of market basket and customer data.

Assortment Analysis integrates planning processes that occur before and during the selling season resulting in tailored merchandise assortment, pricing and promotional support for unique markets and individual stores. The Assortment Management Analysis provides a diverse set of business analyses and reports (views) that will assist a merchant in arriving at better informed decisions regarding the management of his/her product assortments to the store level.

The Assortment Analysis application consists of three application modules:
1. Sales and Inventory Analysis 122: Elementary foundation for sales and inventory analysis reporting; monitoring of sales trends by geography, product and product trait. The Sales and Inventory Analysis provides performance and contribution reporting; analysis of sales, margin and inventory trends; and sales and inventory exception reporting.
2. Seasonal Plan Analysis 124: Analytical support for assortment planning and allocation analysis, added views on seasonal planning and vendor performance measures. The Seasonal Plan Analysis application module provides analysis and metrics concerning: store/area/department performance; item and category contribution; exception monitoring; and days-of-supply and out of stock.
3. Cross Merchandising Analysis 126: Advanced strategic analysis of assortment based on customer segment preferences using analysis of market basket and customer data. The Seasonal Plan Analysis application module provides analysis and metrics concerning: merchandising mix (Item Affinity); customer purchasing behavior (Customer Preferences); product assortment segmentation; and product introductions and deletions tailored to local market requirements.

Promotion Analysis (130). The Promotional Analysis application enables a retailer to analyze "Lift" by product, brand, or vendor, inventory effectiveness, Seasonal/Regional Demand Patterns and Price Point Analysis.

The Promotion Analysis application is designed to more effectively analyze, plan and target your promotions based on item, store and customer data. By allowing for key sales and inventory performance measurements such as "sell thru", ending on hand stock, and sales to be combined and presented over various dimensional perspectives, one is provided with more accurate information regarding a promotion's effectiveness.

The Promotion Analysis application consists of two application modules:
1. Promotional Results Analysis application module 132 provides analysis of promotional lift by product, brand, or vendor. The Promotional Results Analysis application module provides analysis and metrics concerning: promotional performance of individual products; promotional inventory level effectiveness; stock levels during promotional periods by store; regional or seasonal demand patterns; unusual sales patterns by store; analysis of 'forward buying' phenomena; and the impact of promotions on price point strategies
2. Promotional Impact Analysis application module 134 provides advanced analysis of promotional effectiveness as it relates to product driver relationships and product affinities. The Promotional Impact Analysis application module 134 provides analysis and metrics concerning: market basket: time of day behavior differences (day part tracking); and customer product preferences.

Customer Analysis (140). The Customer Analysis application provides critical insight into a retailer's customer base via ranking, deciling, RFM analysis, demographic segmentation, and defining purchase behavior.

The Customer Analysis application consists of a Customer Purchase Analysis application module 142 that provides critical insight into customer base via ranking, deciling, RFM analysis, demographic segmentation, and defining purchase behavior. The Customer Purchase Analysis application module provides analysis and information concerning: targeted customer promotions; optimum promotional item assortment; promotional effectiveness; and enhanced cross merchandising strategies.

Store Analysis (150). The Store Analysis application provides analysis of store sales, labor, controllable expenses and variances.

The Store Analysis application consists of a Store Operations Analysis application module 152 that provides analysis of store sales, labor, controllable expenses and variances so as to provide a deeper understanding of costs, resources, traffic and productivity. The Store Operations Analysis application module provides analysis and information concerning: location sales; labor allocation policies; variable cost control; and resource (time) allocation.

E-Commerce Analysis (160). The E-Commerce Analysis application provides analysis of customer interactions, ad effectiveness, preference profiling, and cross-channel effectiveness.

The E-Commerce Analysis application provides a better understanding of the customer and their interaction with the e-Storefront: including customer, purchase, promotion, and media analysis. The E-Commerce Analysis application consists of three application modules:
1. E-Analysis application module 162 provides a detailed understanding of customer and e-storefront interaction, product and promotional effectiveness, as well as abandonment and fulfillment analysis. The E-Analysis application module provides analysis and metrics concerning: customer acquisition and retention; customer mix and conversation; marketing promotional effectiveness; and merchandising effectiveness.
2. E-Cross Channel application module 164 provides detailed understanding of customer behavior and interactions, product and promotional impact and contribution across customer contact channels. The E-Cross Channel application module provides analysis and metrics concerning: cross-channel customer management; and customer conversion.
3. E-Referral application module 168 provides detailed understanding of e-storefront interaction and referral effectiveness including referral return on investment (ROI). The E-Analysis application module provides analysis and metrics concerning: advertising media mix optimization; media costs; customer mix; and marketing promotional effectiveness.

Logical Data Model Design Basics

A logical data model is a graphical representation of the way data is organized in a data warehouse environment. The logical data model specifically defines which individual data elements can be stored and how they relate to one another to provide a model of the business information. The data model ultimately defines which business questions can be answered from the data warehouse and thus determines the business value of the entire decision support system.

A properly designed LDM for a retail industry provides a foundation for more effective sales, marketing, and operations management and supports the customer relationship management (CRM) requirements related to identifying, acquiring, retaining and growing valuable customers. A logical data model for the retail industry reflects the operating principles and policies of the retail industry and provides the underlying structure for the data imported into the data warehouse A logical data model provides an architecture for the information that will be included in a data warehouse. The database provides the physical realization of that architecture in a form that can be efficiently maintained and used. There may well be some differences between the logical data model and the final database design. The database may include some tables (summary tables, etc.) or columns that have no direct correlation in the logical data model. Elements in the logical model may be grouped differently in the physical database.

A logical data model is organized by Subject Areas, each comprised of numerous Entities, Attributes and Relationships. The data model hierarchy includes one or more Subject Areas. Each Subject Area includes one or more Entities or Tables, each having Attributes and Relationships. Each Attribute describes a fact about an Entity. Relationships between two or more Entities are further defined by Cardinality. The Relationships define which entities are connected to other entities and the cardinality of the relationships. Each of these elements will be described in greater detail below.

Subject Area

A subject area is a subset of objects taken from the universe of data objects for a particular line of business or industry that focus on a particular Business Process. Typically, a subject area is created to help manage large data architectures that may encompass multiple business processes or business subjects. This is the highest-level data concept within a conceptual entity/relationship (E/R) model. Working with subject areas is especially useful when designing and maintaining a large or complex data model. Dividing the enterprise into several distinct subject areas allows different groups within an organization to concentrate on the processes and functions pertinent to their business area.

Entity

An Entity represents a person, place, thing, concept, or event (e.g. PARTY, ACCOUNT, INVOICE, etc.). It represents something for which the business has the means and the will to collect and store data. An Entity must have distinguishable occurrences, e.g., one must be able to uniquely identify each occurrence of an entity with a primary key (e.g. Party Identifier, Account Identifier, Invoice Number, etc.). An Entity is typically named with a unique singular noun or noun phrase (e.g., PARTY, BILLING STATEMENT, etc.) that describes one occurrence of the Entity and cannot be used for any other Entity. It should be exclusive of every other Entity in the database. An Entity cannot appear more than once in the conceptual entity/relationship (E/R) model. Each Entity may have relationships to other Entities residing in its own Subject Area or in other Subject Areas.

Attribute

An Attribute is a data fact about an Entity or Relationship. It is a logical (not physical) construct. It is data in its atomic form. In other words, it is the lowest level of information that still has business meaning without further decomposition. An example would be FIRST NAME, or LAST NAME. An example of an invalid attribute would be PERSON NAME if it includes both the first and last names, as this could be further decomposed into the separate, definable (first name, last name) data facts.

Relationship

A Relationship is an association that links occurrences of one or more Entities. A Relationship must connect at least one Entity. If only one Entity is connected, the Relationship is said to be Recursive. A Relationship is described by a noun or passive verb or verb phase that describes the action taken in the Relationship. A Relationship represent a static state of being between the occurrences of the Entities it connects. Relationships are not intended to represent processes or data flows. They cannot be linked to another Relationships. They may optionally represent future, present, and/or past relatedness. The time frame must be explicitly defined in the data definition. Relationships may contain attributes. In a normalized model, a Relationship containing Attributes will result in the creation of an Entity.

Cardinality

In order for a data model to be considered accurate, it must contain both the maximum and minimum number of Entity occurrences expected. This is controlled by rules of cardinality, which describes a relationship between two Entities based on how many occurrences of one Entity type may exist relative to the occurrence of the other Entity. Typically, it is a ratio, commonly depicted as a one-to-one (1:1); one-to-many (1:N); and many-to-many (M:N) relationship.

The maximum cardinality may be an infinite number or a fixed number but never zero. The minimum cardinality may be zero, or some other positive number, but it must be less than or equal to the maximum cardinality for the same relationship.

The logical data model for the E-Business will now be described in more detail. The logical data model uses IDEF1X modeling conventions, as shown in Table 1.

TABLE 1

Entity Conventions

| Convention | Definition |
|---|---|
| ENTITY1<br>Entity1_PK | Independent entity. An entity is depicted as a box, with its name above the box in singular, uppercase form. Square-boxed entities are independent. They rely on no other entity for their identification. Primary keys are attributes that uniquely identify the entity. Primary keys are shown at the top of the box, separated from other listed attributes by a horizontal line. |
| ENTITY2<br>Entity1_PK (FK)<br>Entity2_PK | Dependent entity. Round-cornered entities are dependent on one or more entities for their identification. (FK) following the primary key attribute indicates a foreign key - an attribute in the entity that is the primary key in another, closely related entity. |
| ENTITY2<br>Entity2_PK<br>Entity1_PK (FK) | An independent entity may also include a foreign key as a "non-primary key foreign key". A non-primary key foreign key is shown below the horizontal line separating primary key attributes from other entity atributes. |

Relationship and cardinality conventions are shown in Table 2.

TABLE 2

Relationship/Cardinality Conventions

| Convention | Definition |
|---|---|
| 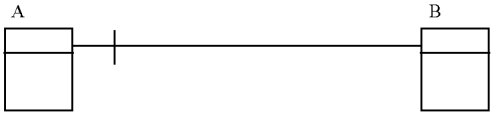 | A single line at the end of a relationship link means that a single record entity B is related to only one record in entity A . . . |
|  | A circle indicates that the presence of a linked record in entity A is optional. |
| 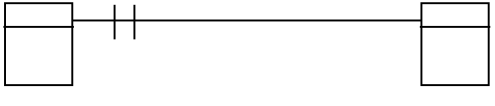 | A double line indicates that the presence of a linked record in entity A is mandatory. |
| 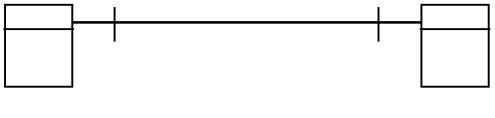 | One-to-one relationship. |
|  | One-to-many relationship. The crow's foot symbol means that more than one instance of an entity is associated with another entity. |
|  | One-to-one-or-more relationship. A crossbar with a crow's foot symbol means there is at least one instance of an entity associated with the other entity. |
|  | One-to-zero-one-or-more relationship. A circle with a crow's feet symbol means there may be zero, one, or many instances of the entity associated with the other entity. |
|  | A dotted relationship line indicates that the identity of entity B is not linked to entity A. |

Retail Logical Data Model

The Retail Logical Data Model (rLDM) is a large data model composed of a large number of tables. To effectively view and understand the data model, the data tables have been logically organized into smaller groups called subject areas. Each subject area is comprised of a set of tables that contain information relevant to a particular entity. In addition, the subject areas address particular business questions.

The Retail Logical Data Model is presented in the Conceptual View illustrated in FIGS. 3A through 3H. This view provides an overall high-level understanding of the major entities and how they relate to each other. The Conceptual View was derived directly from the Retail Logical Data Model by selecting the most important entities from every subject area, being sure that at least one entity from each subject area was selected, and distilling the relationships among the selected entities, while still maintaining the general nature of the way the entities relate to each other. During this process, some intervening entities were abstracted into relationships. Many-to-many relationships were used where appropriate. The result is a simple, easy to understand diagram that conveys the general content of the underlying logical data model.

Subject Area Views, such as the QUALITY FEEDBACK subject area view illustrated in FIGS. 4A through 4F, show small (but highly detailed) subsets of the model. Subject areas are collections of entities about business information objects or concepts that are closely related. The sum total of all subject areas equals the rLDM. For ease of use and understanding, the Retail Logical Data Model has been divided into the following fifty-six (56) subject areas, titled:

1. ADDRESS
2. AGREEMENT

3. ASSOCIATE LABOR
4. CATALOG
5. DEMOGRAPHICS
6. FM.AP AR PA INVOICE
7. FM.AP INVOICE
8. FM.AP PAYMENT
9. FM.AR INVOICE
10. FM.AR PAYMENT AND COLLECTION
11. FM.FA FIXED ASSET
12. FM.GL.ASSET ACCOUNT
13. FM.GL.EQUITY ACCOUNT
14. FM.GL.EXPENSE ACCOUNT
15. FM.GL.GENERAL LEDGER ACCOUNT
16. FM.GL.CHART OF ACCOUNT BALANCE
17. FM.GL.PRODUCT SEGMENT
18. FM.GL.PROJECT SEGMENT
19. FM.GL.SUB ACCOUNT
20. FM.GL.JOURNAL ENTRY
21. FM.GL.LIABILITY ACCOUNT
22. FM.GL.REVENUE ACCOUNT
23. FM.PA PROJECT
24. FM.PA PROJECT RESOURCE
25. FM.PARTY
26. FM.PO PROCUREMENT
27. FM.PO PROCUREMENT RECEIPT
28. FM.PO PROCUREMENT RETURN
29. ITEM DEFINITION
30. ITEM PRICING
31. INVENTORY (EXTERNAL)
32. INVENTORY (INTERNAL)
33. INVOICE
34. LOCATION
35. MODEL SCORE AND FORECAST
36. MULTIMEDIA
37. PARTY
38. PAYMENT ACCOUNT
39. PHARMACY
40. PLANOGRAM
41. POINT OF SALE REGISTER
42. PRIVACY
43. PROMOTION
44. QUALITY FEEDBACK
45. RFID/SERIALIZED ITEM TRACKING
46. SALES (EXTERNAL)
47. SALES (INTERNAL)
48. SHIPPING ORDER
49. SHIPPING PLAN
50. SHIPPING REGULATION
51. SHIPPING TRANSPORT
52. TIME PERIOD
53. VENDOR (SUPPLIER)
54. WEB OPERATIONS
55. WEB SITE
56. WEB VISIT

Details about each of these subject areas follow.

Figure 3A:
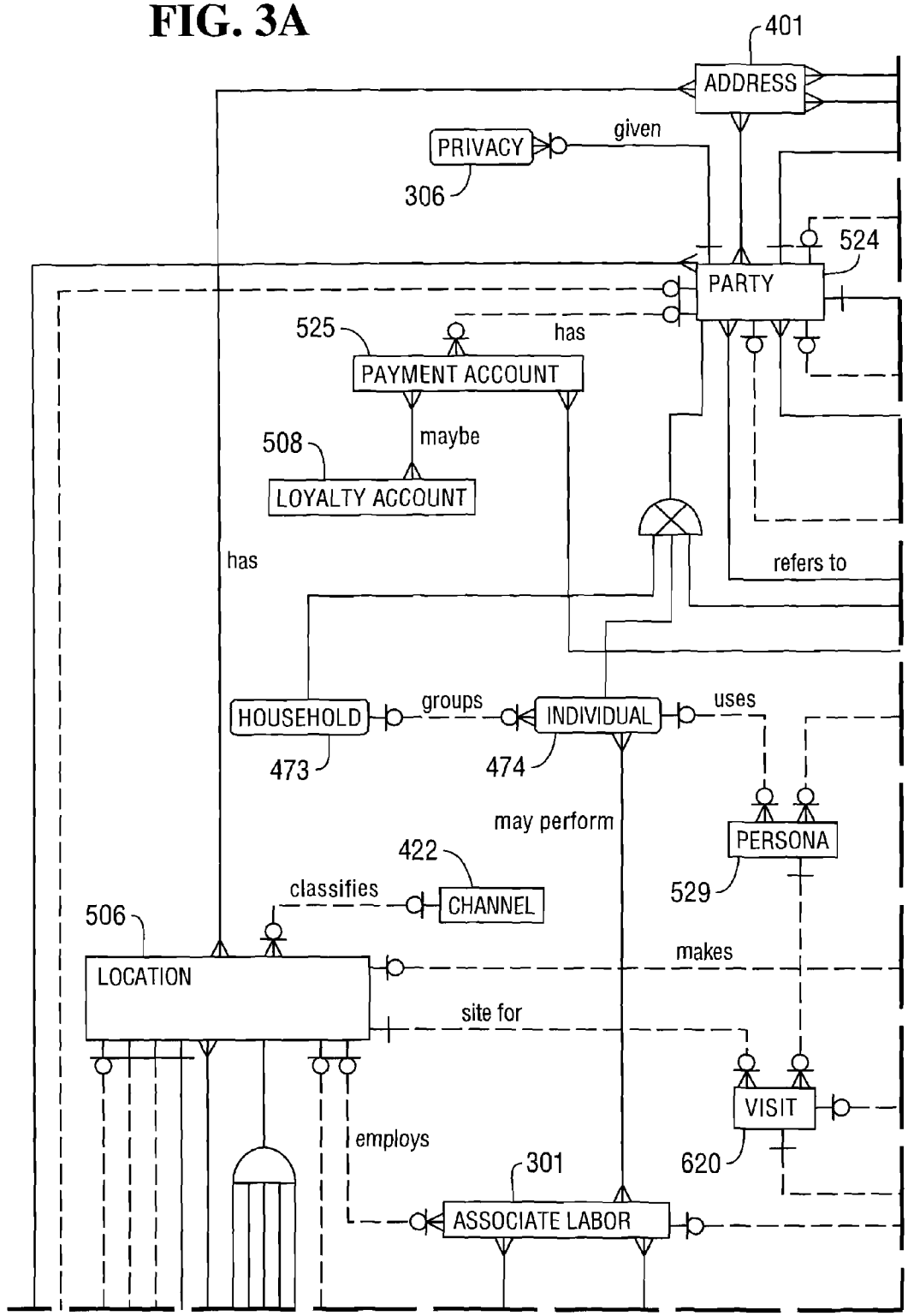
FIGS. 3A through 3H, taken together, provide a conceptual data model view of a retail industry logical data model (retail LDM) illustrating the most important entities in the retail LDM and how they generally relate to each other, in accordance with the preferred embodiment of the present invention.
Figure 3B:
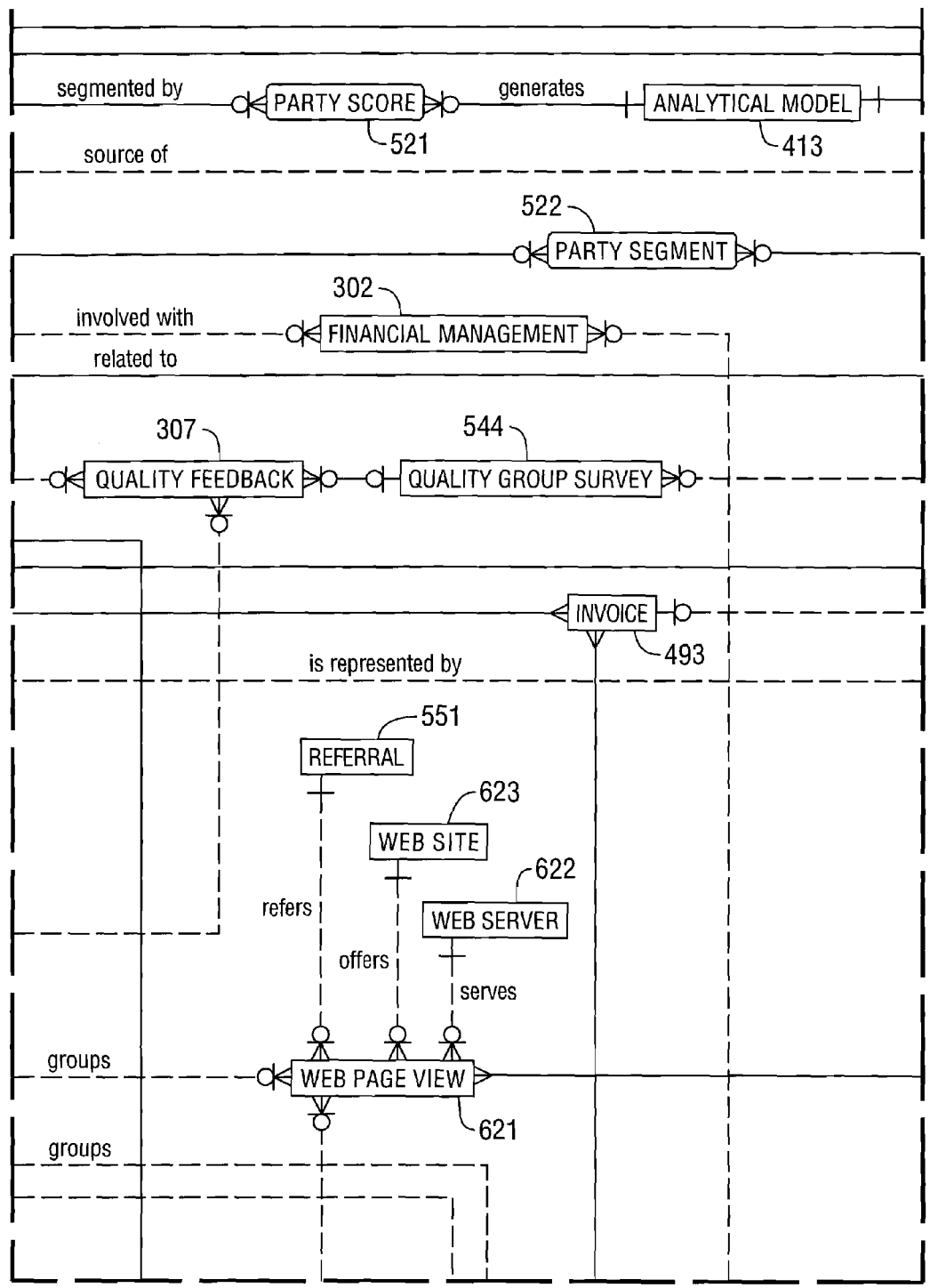
Figure 3C:
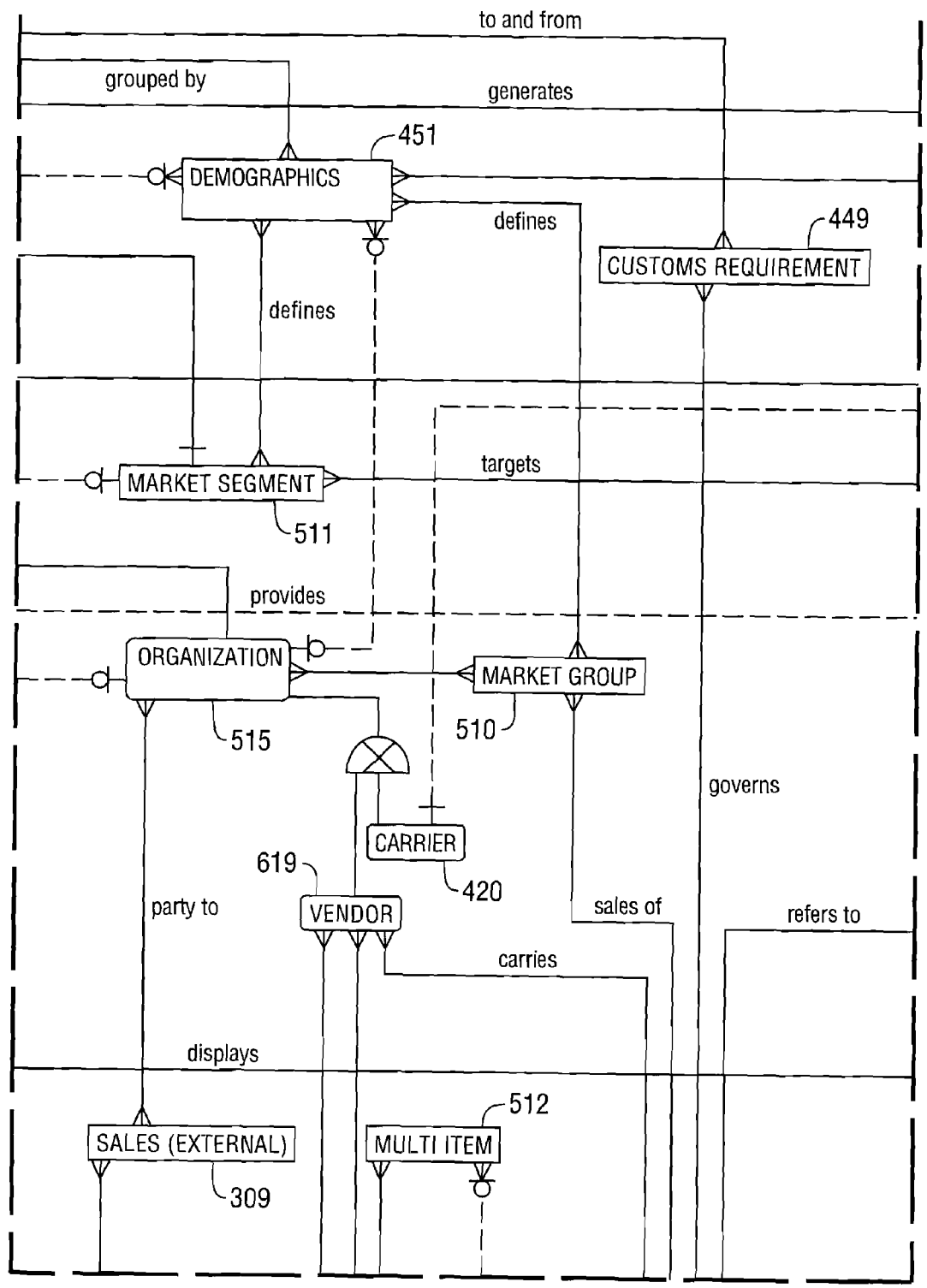
Figures 3, 3D:
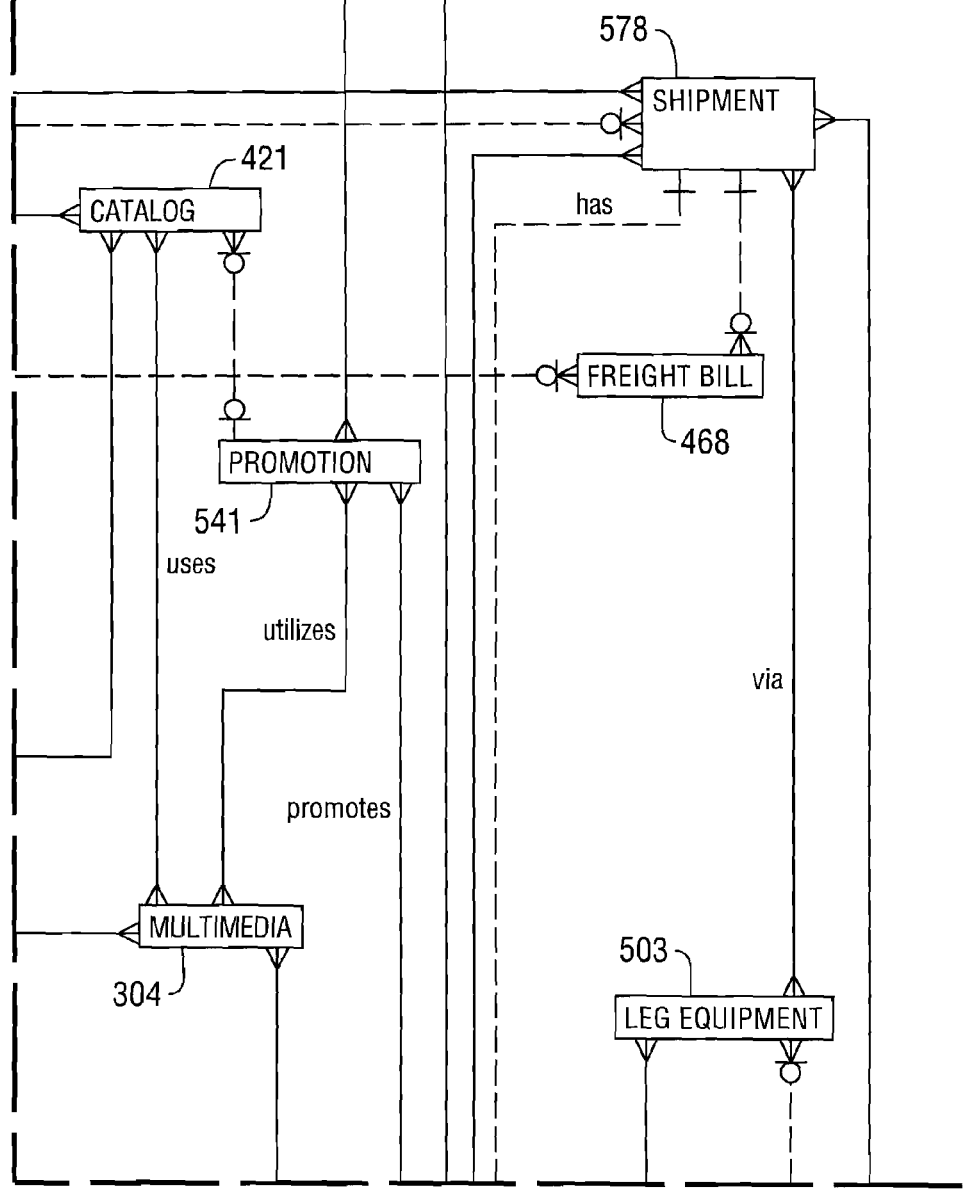
Figure 3E:
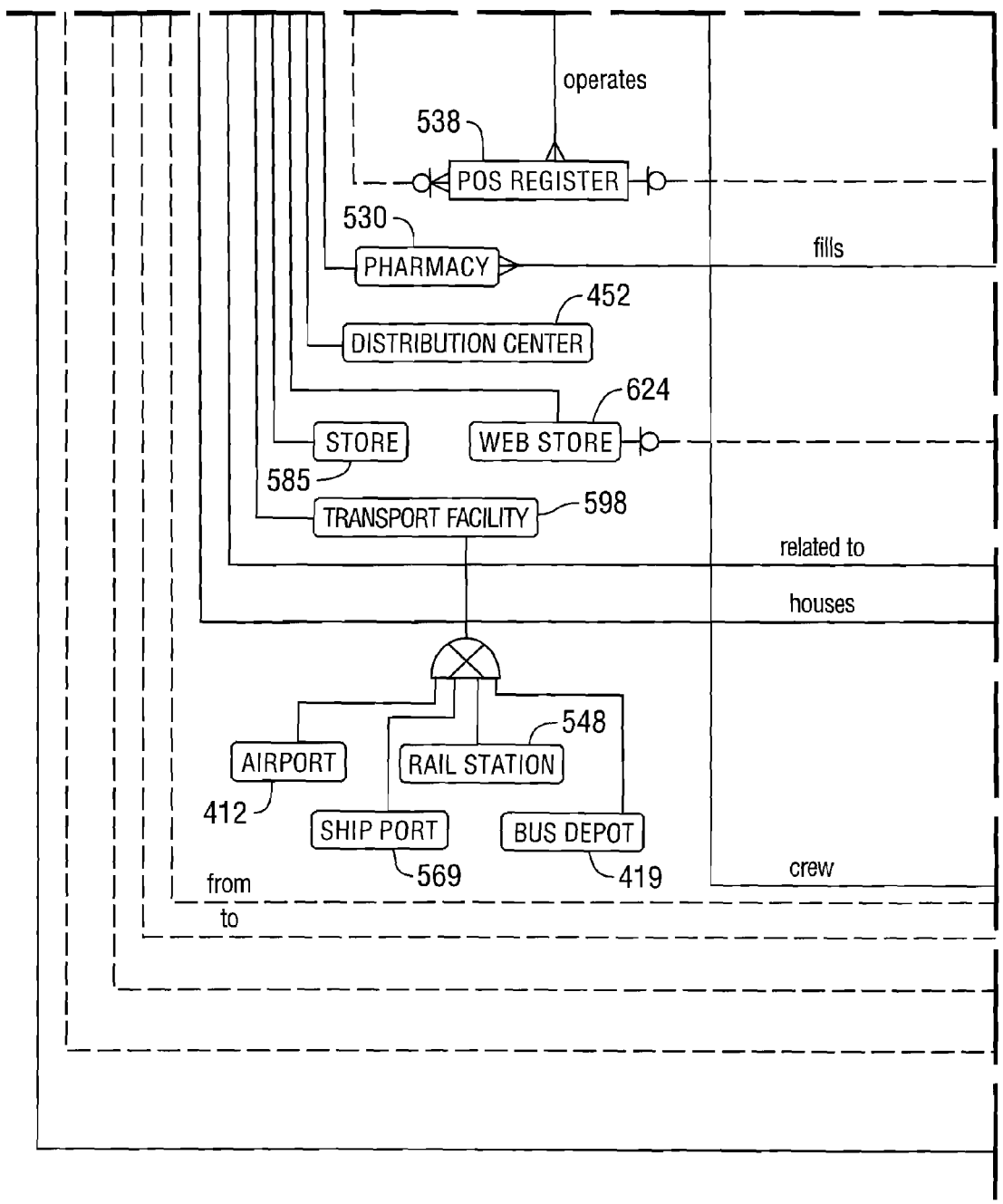
Figure 3F:
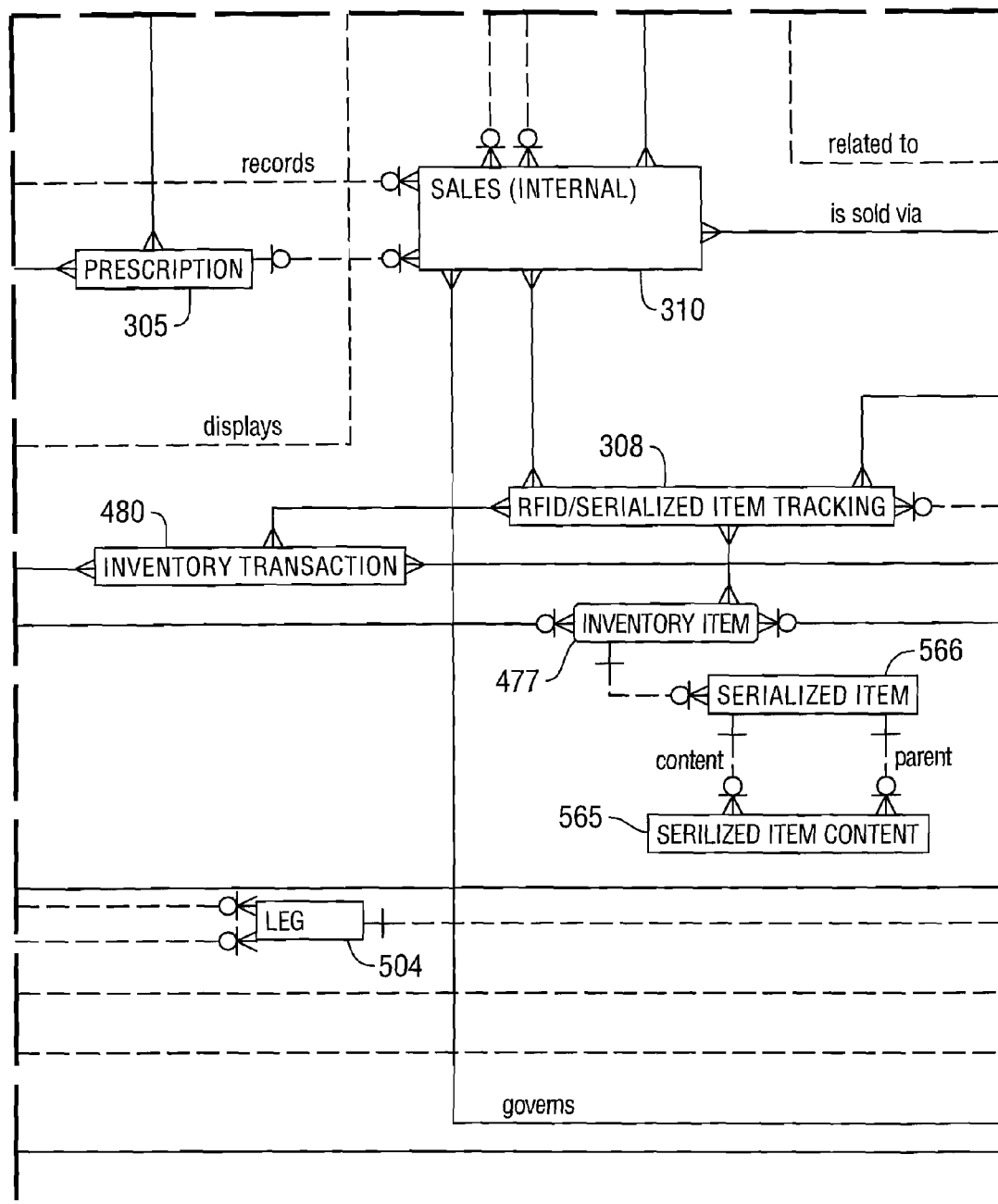
Figure 3G:
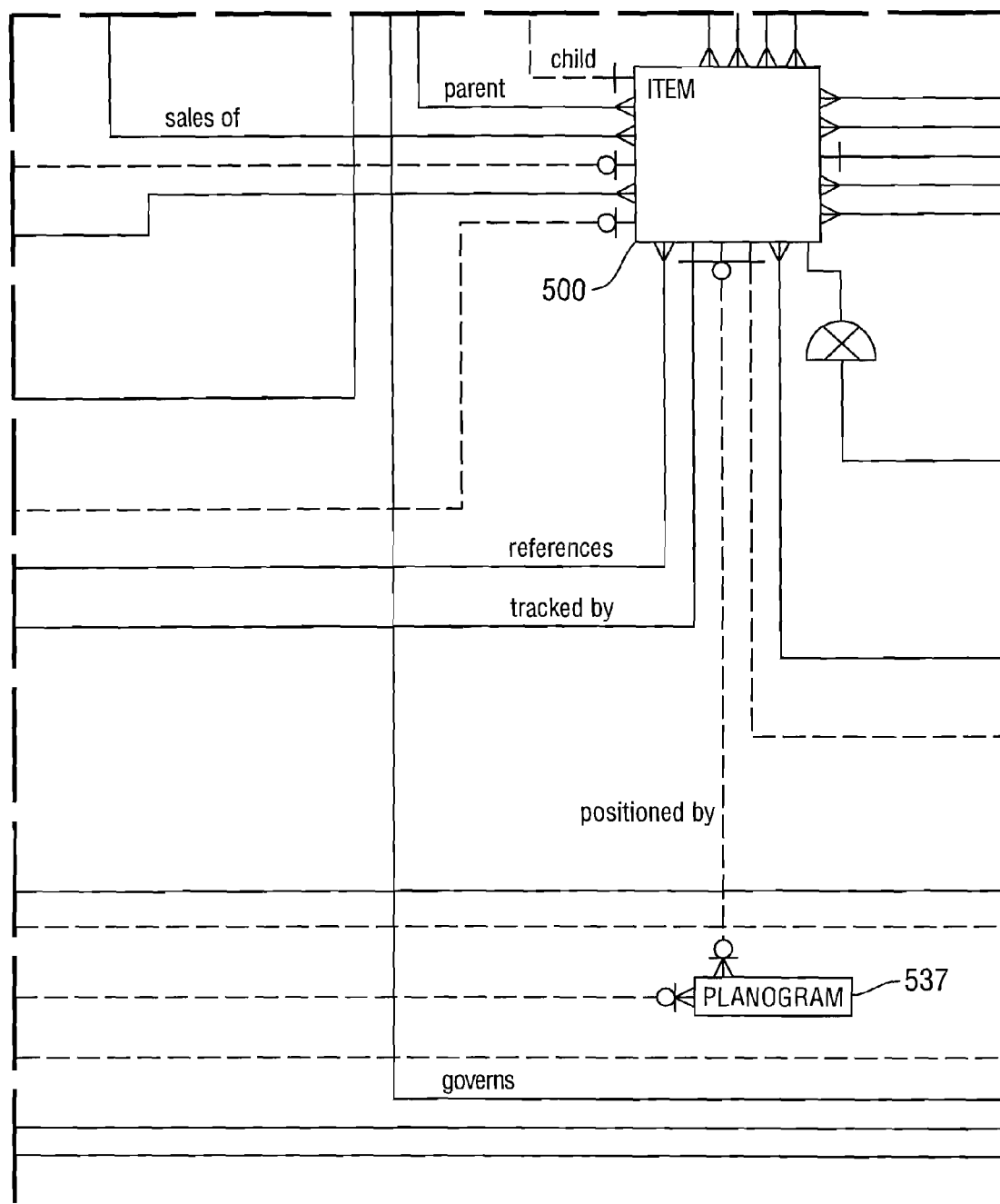
Figure 3H:
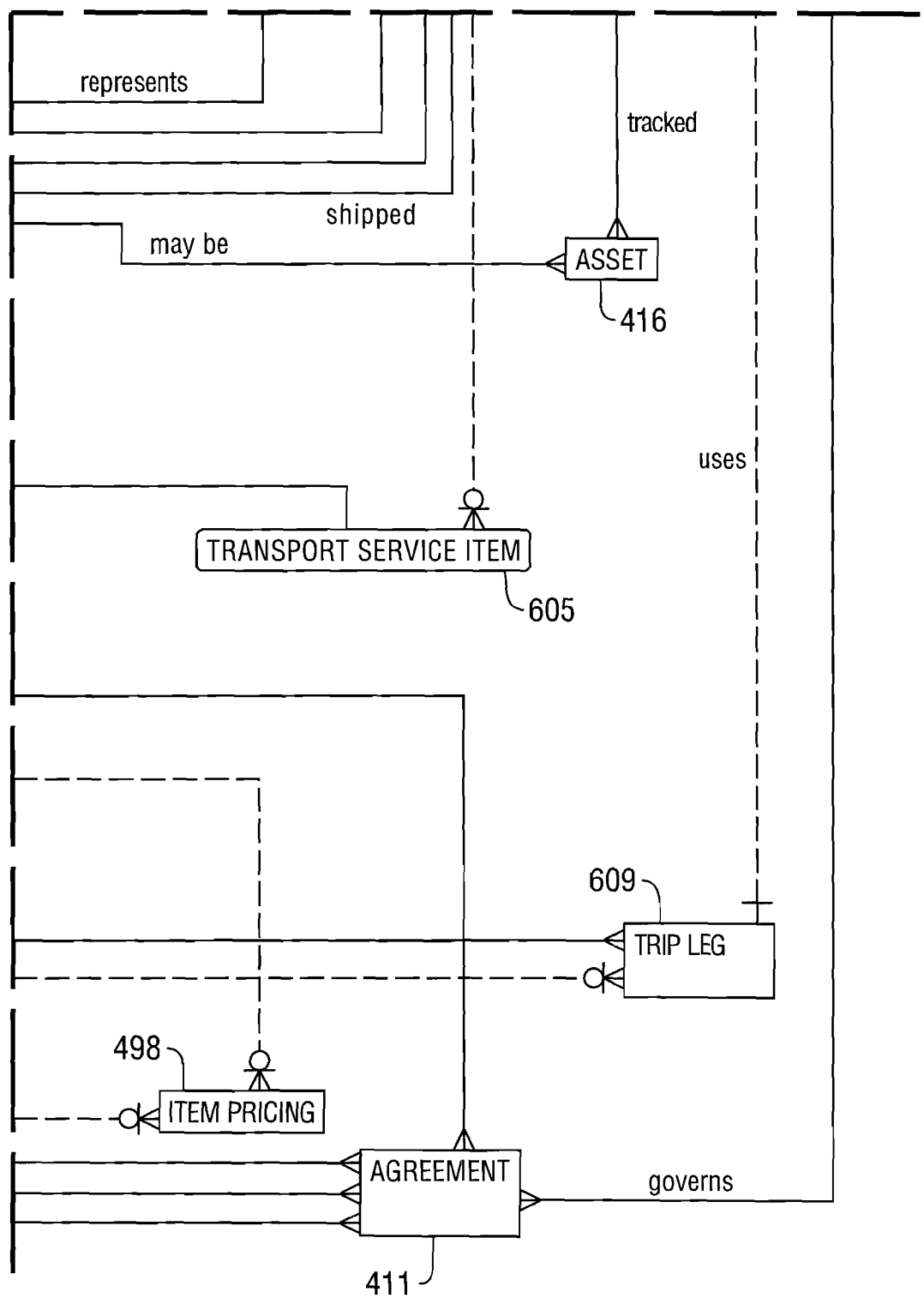
Figure 4A:
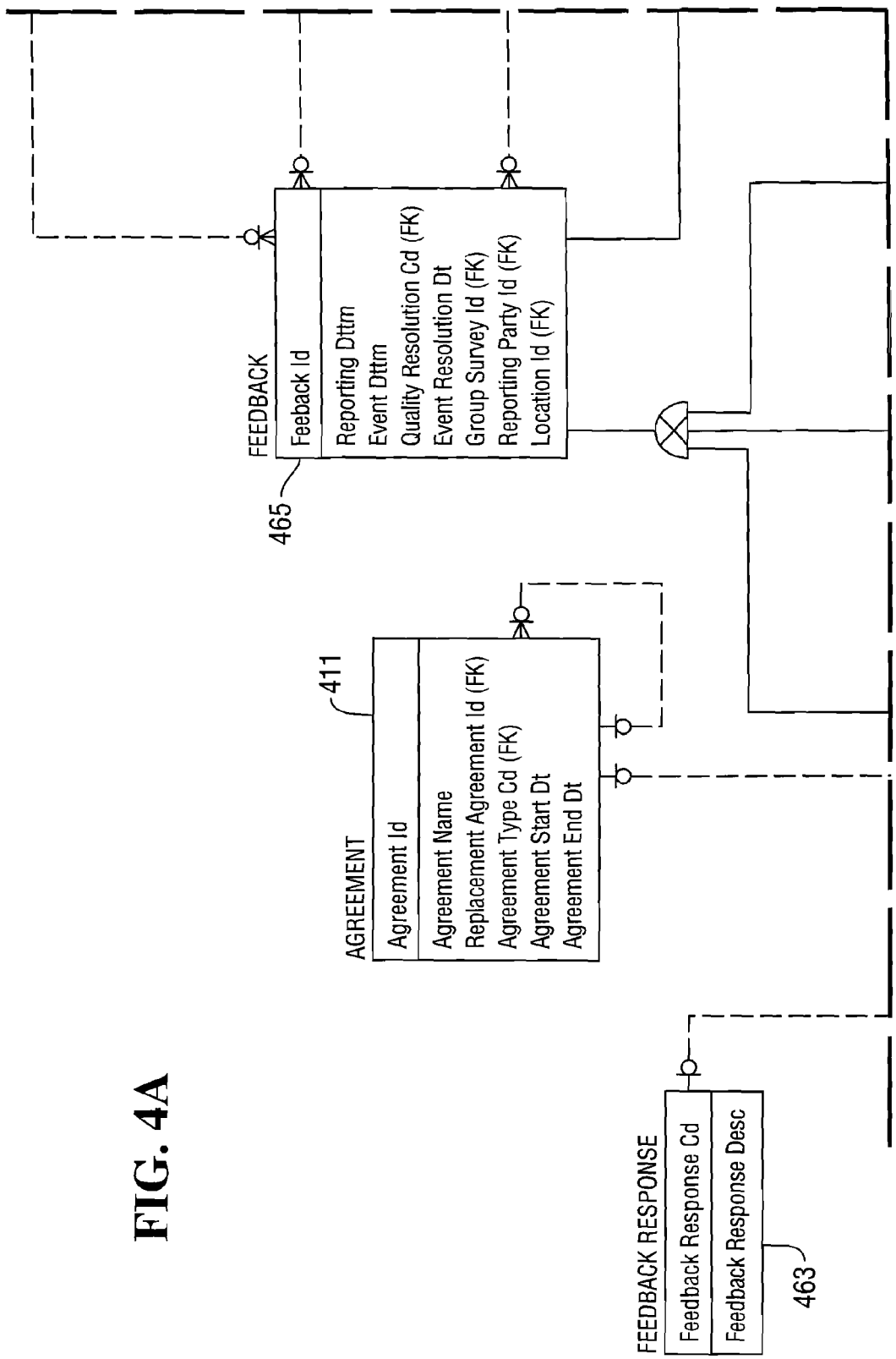
FIGS. 4A through 4F illustrate an entity-relationship diagram of the QUALITY FEEDBACK subject area of the logical data model in accordance with the preferred embodiment of the present invention.
Figure 4B:
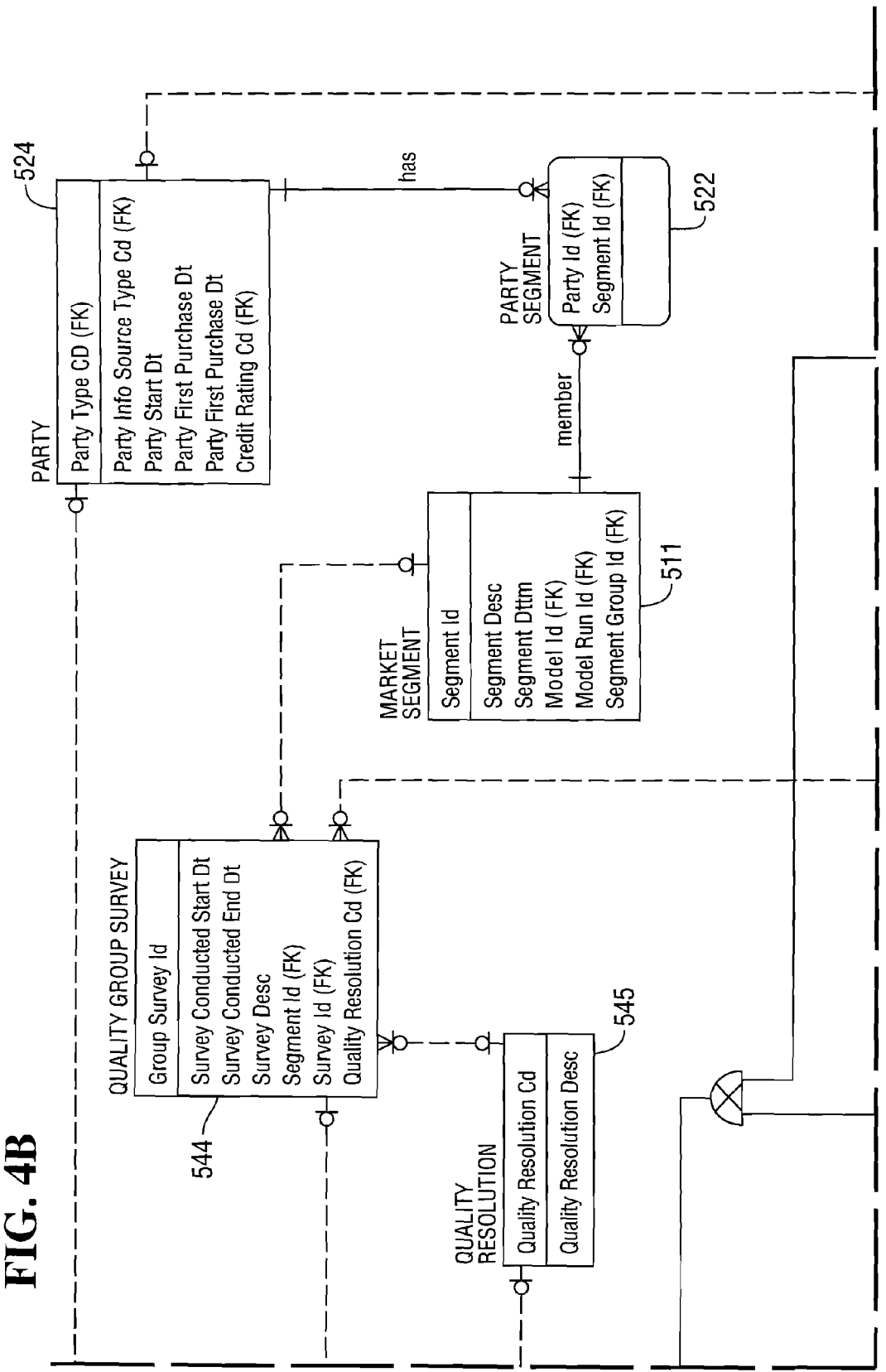
Figure 4C:
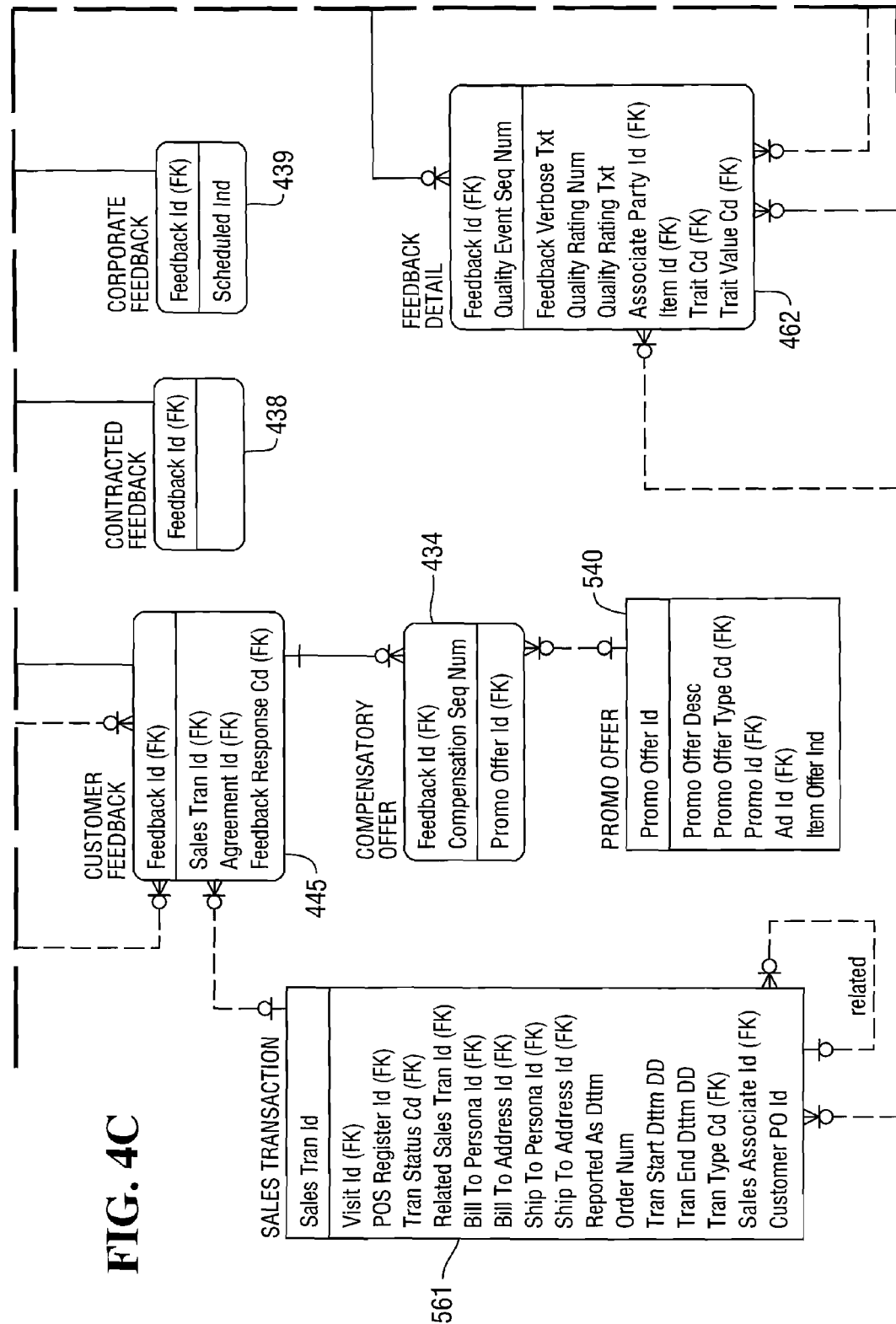
Figure 4D:
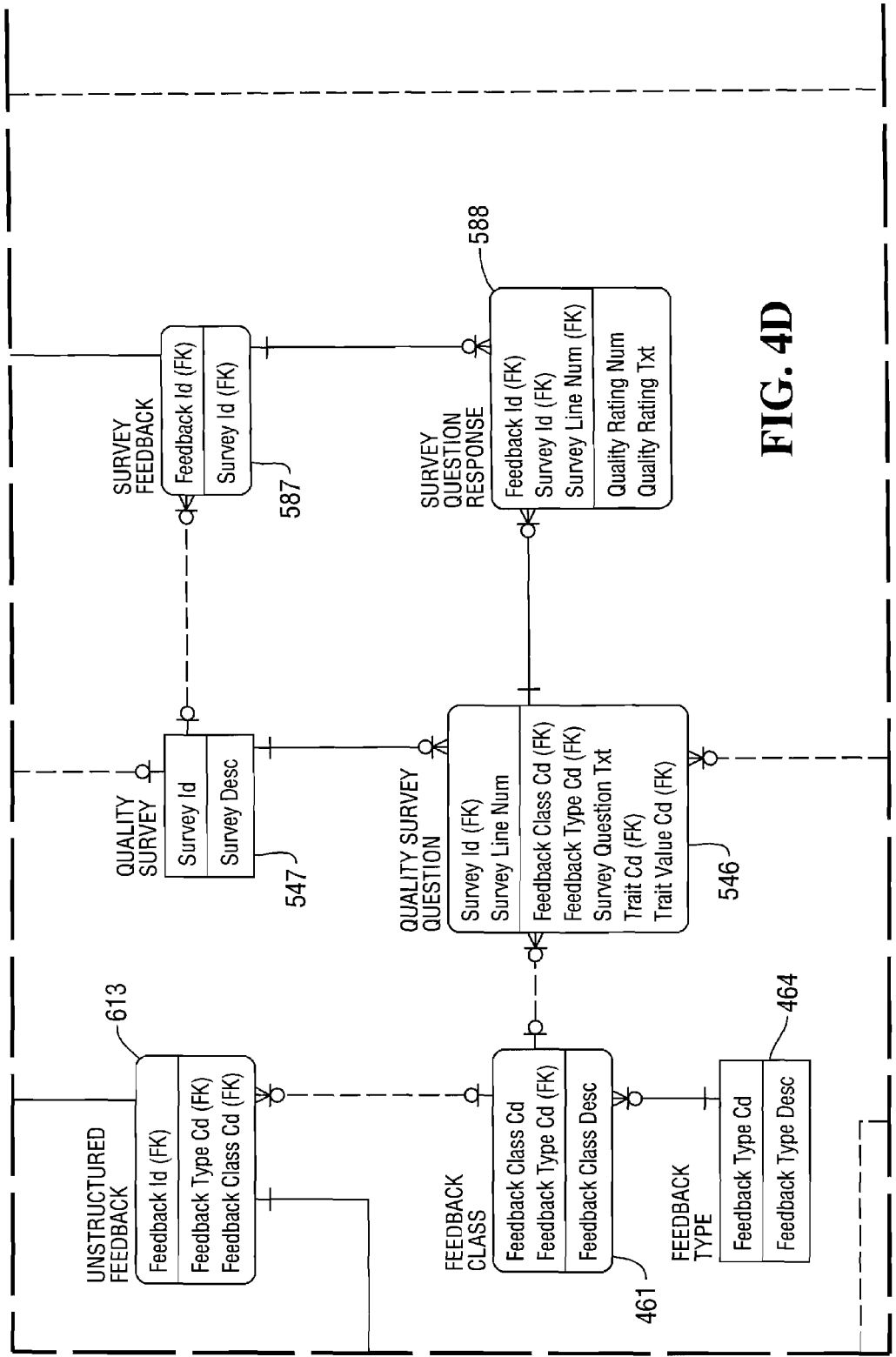
Figure 4E:
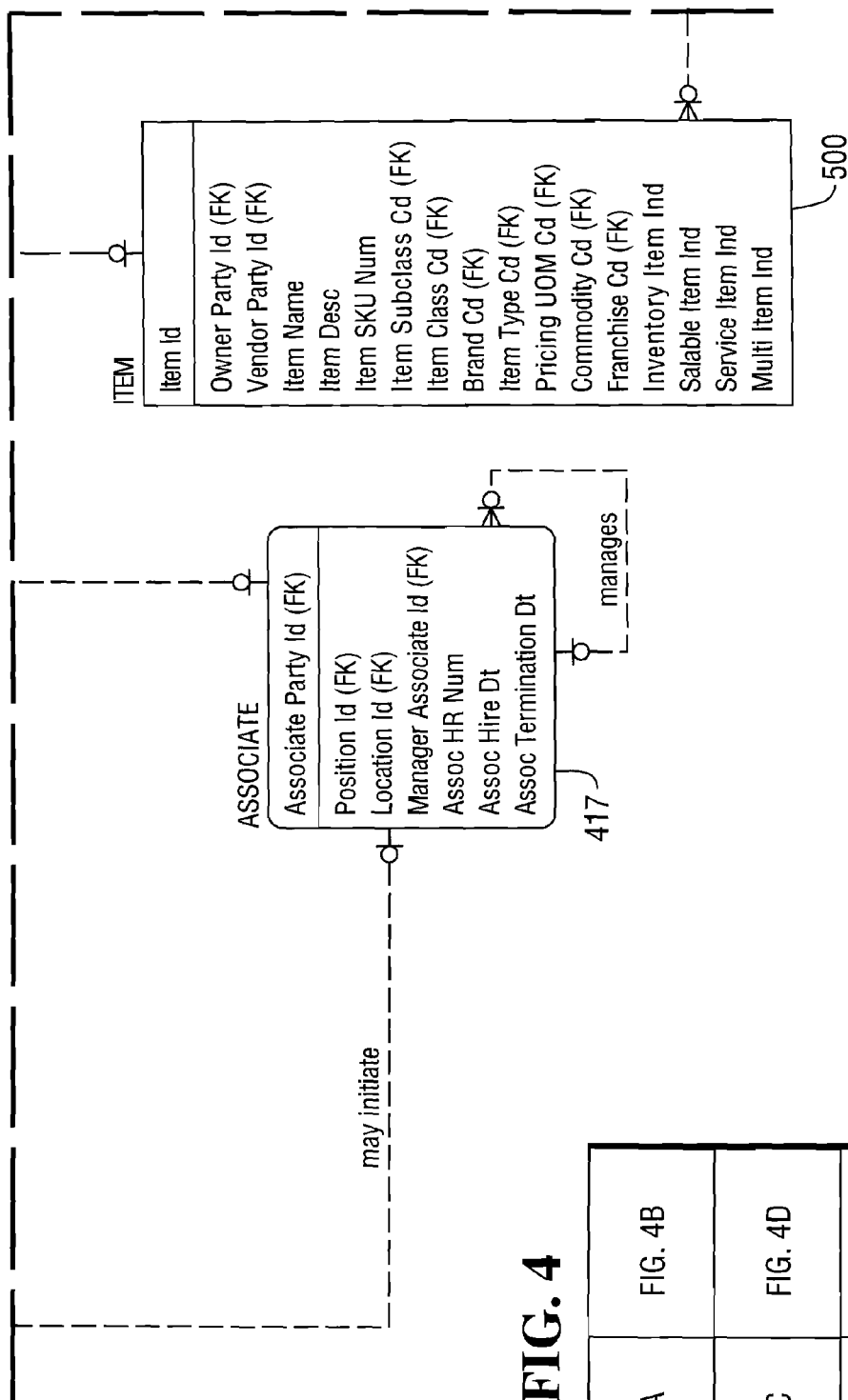
Figure 4:
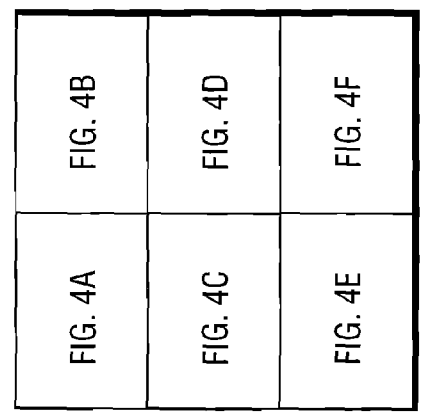
Figure 4F:
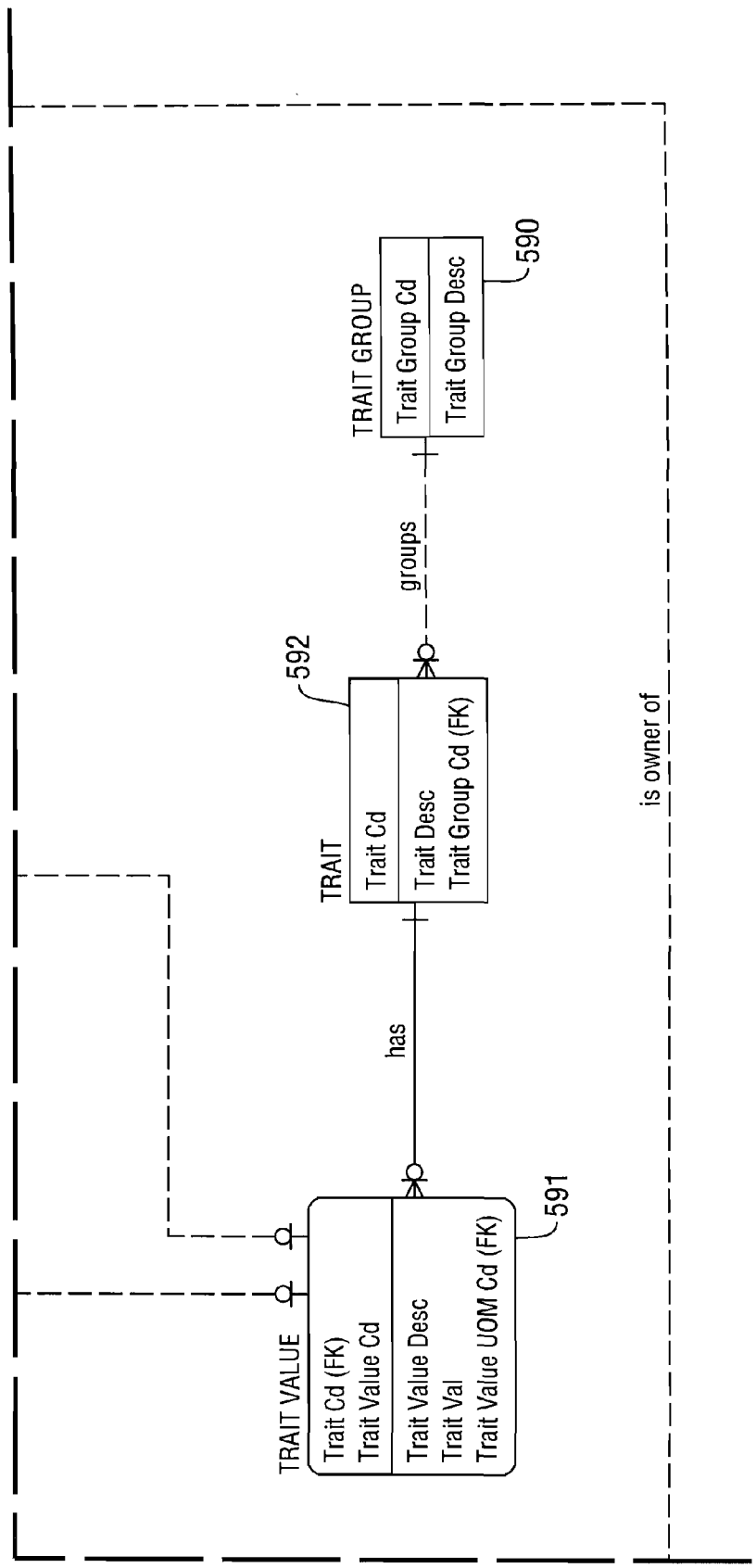

The ADDRESS subject area, represented by ADDRESS entity 401 in the conceptual model of FIG. 3, is used to capture all ADDRESS information that can be used for communications and physical addressing. Each unique occurrence of an ADDRESS may represent a physical MAILING ADDRESS (e.g., street, post office box), a TELEPHONE ADDRESS (e.g., voice or fax number), or an ELECTRONIC ADDRESS (e.g., e-mail, ftp, or URL). Internet Protocol addresses are modeled separately in the entity IP ADDRESS within the WEB VISIT subject area.

The AGREEMENT subject area, represented by AGREEMENT entity 411, defines the specific terms and conditions between Parties. This subject area is used to track the specific agreements made relating to pricing, as well as the specific terms and conditions associated with the sale, payment and/or delivery of products and/or services between Parties, in a quantitative manner, so that analysis can be better performed to determine performance compliancy.

The ASSOCIATE LABOR subject area, represented by ASSOCIATE LABOR entity 301 in FIG. 3, defines key business characteristics of an ASSOCIATE, sometimes referred to as an "employee" who, as an individual, is part of the internal organization of the Enterprise. The key emphasis of the ASSOCIATE LABOR subject area is to track the critical information necessary to understand, analyze and make better decisions regarding an Enterprise's labor costs and related labor expenses, as they relate to each ASSOCIATE.

This section models both the forecasted, or planned, labor for each location (stores, distribution and call centers, etc.) in cost amounts and hours (including overtime) and the schedule of work for each Associate. A history of expenses related to associate labor and benefits is provided to aid in comparison analyses.

The CATALOG subject area, represented by entity 421 in FIG. 3, is used to describe the content and usage of catalogs by an enterprise. The intent is to accommodate the typical printed catalog that is mass-mailed to a targeted/segmented group of potential customers. This Subject Area allows tracking of the success of a specific catalog or mailing, since it is related to the SALES (INTERNAL) Subject Area, indicating which sales were made from which catalog mailed to what target group.

Although targeted mainly at enterprises doing conventional catalog/mail order business, this section can be adapted for usage to also describe promotional flyers, and other printed offerings if required.

The pages of a Catalog may be either printed for mailing and physical distribution or may be "virtual" pages placed on a web site. Additional features are available on web sites such as keyword search and automated orders. This type of customer interaction is captured in the WEB VISIT subject area.

The DEMOGRAPHICS subject area is represented in FIG. 3 by DEMOGRAPHIC entity 451, MARKET GROUP entity 510 and MARKET SEGMENT entity 511. The DEMOGRAPHICS subject area contains information obtained (purchased/leased) from external sources. Its primary usage is for the creation of SEGMENTs (groups of PARTYs sharing common characteristics) for marketing purposes.

MARKET GROUPs record third party aggregated sales data, such as that purchased from Nielson or IRI, for example. Information about these groups (e.g., supermarket, category discounter, drug store, etc.) is typically purchased and often used by the Enterprise to measure its performance in the marketplace. Market Groups may also be associated with various DEMOGRAPHICs.

MARKET SEGMENTs are groups of PARTYs targeted by the Enterprise for marketing and/or analysis (and may be formed via algorithmic modeling or forecasting—See MODEL SCORE & FORECAST Subject Area). These segments are also related to DEMOGRAPHICs to enhance and support analysis and targeted sales campaigns (See PROMOTION Subject Area).

The twenty-three Financial Management (FM) subject areas; FM.AP AR PA INVOICE, FM.AP INVOICE, FM.AP PAYMENT, FM.AR INVOICE, FM.AR PAYMENT AND COLLECTION, FM.FA FIXED ASSET, FM.GL.ASSET ACCOUNT, FM.GL.EQUITY ACCOUNT, FM.GL.EXPENSE ACCOUNT, FM.GL.GENERAL LEDGER ACCOUNT, FM.GL.CHART OF ACCOUNT BALANCE, FM.GL.PRODUCT SEGMENT, FM.GL.PROJECT SEGMENT, FM.GL.SUB ACCOUNT, FM.GL.JOURNAL ENTRY, FM.GL.LIABILITY ACCOUNT, FM.GL.REVENUE ACCOUNT, FM.PA PROJECT, FM.PA PROJECT RESOURCE, FM.PARTY, FM.PO PROCUREMENT, FM.PO PROCUREMENT RECEIPT, FM.PO PROCUREMENT RETURN; are represented by a single entity, FINANCIAL MANAGEMENT entity 302 in FIG. 3.

The FM.AP AR PA INVOICE subject area contains information related to various types of billing documents or Invoices encountered by a business. Invoices are presented to a bill-to-party as a request for payment for goods sold or services rendered. This subject area links the Invoice detail back to the originating business transactions for verification and analytical purposes.

The FM.AP INVOICE subject area describes the details around amounts owed to a supplier for goods and services purchased. The Accounts Payable subledger holds details for these transactions including reimbursable expenses (employee expense reports) and recurring expenses.

The FM.AP PAYMENT subject area holds payment details for AP Invoices. Payments are the partial or complete discharge of the invoice obligation, typically by its settlement in the form of a transfer of funds. Payments may be applied against obligations represented by one or more Invoices.

The FM.AR INVOICE subject area describes the details around amounts billed to customers for goods and services sold. Summary Accounts Receivable amounts as well as sales and revenue amounts from the AR subledger are recorded to the company's General Ledger.

The FM.AR PAYMENT AND COLLECTION subject area describes the details concerning the process of converting Accounts Receivable to Cash. Payments may be received for AR Invoices, as well as interest earned, rents receivable, or periodic products and services provided. Collection activity includes any action a company takes to solicit settlement of AR obligations.

The FM.FA FIXED ASSET subject area holds information needed to track the addition and disposal of the tangible property of the business. This subject area also holds information needed to calculate and record the depreciation of an asset, including term, depreciation methods, accounting cycle, costs and residual values.

The FM.GL.ASSET ACCOUNT subject area contains information concerning enterprise assets. Assets are tangible or intangible property owned by a business, having monetary value (usually at cost or fair market value). These range from cash and investments to real estate such as land, other tangible property such as timber, or enforceable claims against others, etc. For accounting purposes these are usually classified under three groups: Current Assets, Fixed Assets and Other Assets.

The FM.GL.CHART OF ACCOUNT BALANCE subject area contains information concerning an enterprise's Chart of Account Balances. GL Chart of Accounts Balances are actual amounts experienced through some point in time, or budgeted amounts projected for a financial plan. Companies maintain only one record of actual amounts, but may define multiple financial plans and maintain balances for each financial plan instance.

The FM.GL.EQUITY ACCOUNT subject area contains information concerning equity in an enterprise. Equity is the shareholders' stake in any company/business. From a financial accounting standpoint, Equity is total assets less total liabilities, also referred to as Net Worth.

The FM.GL.EXPENSE ACCOUNT subject area contains information concerning enterprise expenses. Expense is the amount spent by a company in running the business and producing goods or services. Some of the typical expense accounts are OPERATING EXPENSE ACCOUNT, INTEREST EXPENSE ACCOUNT, etc.

The FM.GL.GENERAL LEDGER ACCOUNT subject area contains information concerning an enterprise's General Ledger. The General Ledger is a collection of all accounts used by a business. It is the accounting transaction record, maintained either manually or using computer software, of all the balance sheet and income statement balances of a company or business. Previously as the name suggests, the General Ledger was a collection of books that was used to physically record accounting transactions. Today these transactions are generally recorded and stored by using computer software.

There are five main types of GENERAL LEDGER (GL) ACCOUNTs. They are ASSET ACCOUNT, LIABILITY ACCOUNT, EXPENSE ACCOUNT, REVENUE ACCOUNT and EQUITY ACCOUNT. Each account in turn may have sub-ledgers. For example, ASSET ACCOUNT consists of a group of accounts such as Fixed Asset Account, Current Asset Account, etc. The GL ACCOUNTs are shared by various internal organizations within a business and therefore are associated with other GL Segments in segment groups to track and report financial information.

The FM.GL.JOURNAL ENTRY subject area contains information concerning an enterprise's Journal Entries. Journal Entries record the monetary value of business transactions into GL Accounts as debits or credits. Journal Entries usually include supporting information referencing the transaction events or items affected, such as a vendor invoice, customer invoice, or inventory receipt.

The FM.GL.LIABILITY ACCOUNT subject area contains information concerning liabilities of an enterprise. The liabilities of a company are amounts owed to other parties or organizations representing loans, expenses, or any other form of a legally enforceable claim on the company's assets, excluding owner's equity that calls for the transfer of assets at a determined future date.

The FM.GL.PRODUCT SEGMENT subject area is associated with GL Accounts in segment groups to track and report financial product information.

The FM.GL.PROJECT SEGMENT subject area is associated with GL Accounts in segment groups to track and report financial project information. The GL PROJECT SEGMENT is used to track details of any type of business project activity.

The FM.GL.REVENUE ACCOUNT subject area contains information concerning enterprise revenue. Revenue (sometimes referred to as income) refers to the amount of money earned by a company.

The FM.GL.SUB ACCOUNT subject area is associated with GL Accounts in segment groups to track and report financial transactions for a company.

The FM.PA PROJECT subject area provides more granularity to project financial information than a General Ledger. Project Accounting (PA) focuses on maintaining control over revenues, costs, resources, and assets directly associated with a project.

A project can be any set of related business activities for which a company wishes to track financial information. Project expenses may include associates' time and expense reports, vendor expenses, and capital expenses. Project revenue is generated when project expenses are billable to a customer. PA generates the detailed information needed to create a customer invoice, but the invoice is actually processed through the billing function of Accounts Receivable.

Within PA, budgets by project, resource, task, etc. may be maintained separately from the General Ledger budget. PA supports project reporting by task, resource, vendor, and customer for different currencies and time periods. In some cases, PA tracks projects by specific project reporting periods, which may be separate from a company's accounting period.

The FM.PA PROJECT RESOURCE subject area tracks items and individuals assigned to a scheduled task in a project plan. The cost and billable rates associated with these Items and Individuals will be used in the Project Financial Plan.

The FM.PARTY subject area defines the people and organizations of interest to the enterprise as they pertain to Financial Management and its particular business requirements.

The FM.PO PROCUREMENT subject area represents information related to the process of acquiring the goods (materials, parts, supplies, equipment) required to run the business. PO Procurement as an overall business function covers the process from requisition to order, to tracking receipts and returns.

The FM.PO PROCUREMENT RECEIPT subject area tracks the actual receipt of items ordered for comparison to the Purchase Order and related AP Invoice. It also allows for analysis as to whether the original due dates for the receipt were actually met.

The FM.PO PROCUREMENT RETURN subject area holds information about transactions where the receiving PARTY sends back to the vendor or supplier Item(s) that were previously received.

The INVENTORY subject areas, represented in the conceptual model of FIG. 3 by INVENTORY ITEM entity 477 and INVENTORY TRANSACTION entity 480 details the movement of inventory between locations (facilities) as well as tracking physical and calculated stock levels and value, and provides for controlling in-stock and replenishment levels. Inventory is a company's merchandise, raw materials, and finished and unfinished products which have not yet been sold. Inventory can be individually valued by several different means, including cost or current market value, and collectively by FIFO (First in, first out), LIFO (Last in, first out) or other techniques.

The INVENTORY (EXTERNAL) subject area details the adjustments to Inventory where at least one EXTERNAL Location is involved. Control of Inventory is transferred to or from a Third Party and Inventory is adjusted accordingly.

The INVENTORY (INTERNAL) subject area details the movement of inventory between and the adjustments to inventory where only INTERNAL locations (e.g., Stores, DCs, Warehouses) are involved. Control of inventory is not transferred to or from a Third Party.

The INVOICE subject area, represented by INVOICE entity 493, holds information concerning INVOICEs, which represent a request for payment by a third party vendor (supplier) to the enterprise, or by the enterprise to a customer for goods provided or services rendered.

The ITEM DEFINITION subject area, represented by ITEM entity 500 in FIG. 3 details all the ITEMs of interest to an enterprise. An ITEM is the lowest level for which inventory and sales records are retained within the retail store. It can be analogous to a SKU (Stock Keeping Unit).

The ITEM PRICING subject area, represented by ITEM PRICING entity 498, supports Item Pricing and Costing. The inclusion of effective dates allows for historical pricing and costing information to be captured. Future pricing information can also be captured.

The LOCATION subject area, represented by entities 506 and 422, LOCATION and CHANNEL, respectively, in FIG. 3, defines a physical or virtual site or facility which is owned or leased by a retailer to support the sale of goods, distribution, and storage. A LOCATION may be a WEB STORE, KIOSK, CALL CENTER, "brickand-mortar" STORE, PHARMACY, DISTRIBUTION CENTER, etc.

The MODEL, SCORE & FORECAST subject area supports functional areas such as:

(1) CUSTOMER RELATIONSHIP MANAGEMENT (CRM). By using Customer Scoring the Enterprise can tag their customers in a multitude of different ways to highlight their best customers for differentiated treatment. Example:

Customers can be 'scored' for profitability, frequency of purchases, propensity to buy, etc. Vendors and suppliers may similarly be 'scored' on accuracy of orders, delivery time etc.

(2) DEMAND AND SUPPLY CHAIN MANAGEMENT. The various forecasting entities can be populated by the enterprise using their own statistical methods or by using the output of 3rd party applications. Since the model contains internally generated Sales and Order Forecasts, as well as Vendor generated Forecasts, these forecasts can be compared for possible deltas and exception reporting. And:

(3) KNOWLEDGE MANAGEMENT/DATA MINING. Supports information regarding the Analytical Models used to predict, cluster, or classify information that is typically used in Data Mining and Knowledge Discovery. Example: A Model that describes the propensity of a customer to buy a given item, etc.

The MODEL, SCORE & FORECAST subject area is represented in the conceptual model of FIG. 3 by ANALYTICAL MODEL entity 413, FORECAST entity 303, and PARTY SCORE entity 521.

This MULTMEDIA subject area, represented by entity 304 in FIG. 3, models the various multimedia elements that the enterprise uses to construct marketing collateral The PARTY subject area defines the people and organizations of interest to an enterprise. This subject area is represented in the conceptual model by PARTY entity 524, HOUSEHOLD entity 473, INDIVIDUAL entity 474, ORGANIZATION entity 515, and PERSONA entity 529.

The PAYMENT ACCOUNT subject area, represented by PAYMENT ACCOUNT entity 525 and LOYALTY ACCOUNT entity 508 in FIG. 3, describes the mechanism by which goods are be paid for, other than cash). Three main areas are described: conventional, typically external, payment accounts, such as credit cards, checking accounts, in-house credit cards, etc.; loyalty accounts comprising in-house programs designed to encourage customers to make purchases by offering rewards; and internal accounts such as Gift Cards, Gift Certificates, etc.

The PHARMACY subject area represents information about the dispensing and payment for prescription drugs, from the perspective of a Retail Pharmacy. This subject is represented in FIG. 3 by PHARMACY entity 530 and PRESCRIPTION entity 305.

The PLANOGRAM subject area, represented by entity 537 in FIG. 3, models information concerning where items are located in a store, as well as relationships to other items in their proximity.

The POINT OF SALE REGISTER subject area is represented by entity 538 in FIG. 3. This subject are is used to capture all non-sales related transactions involving P.O.S. Registers (Associate sign-in/out or No-Sale events, etc.) as well as specific sales transaction related keying sequence events (quantity key, price override). Application areas that can make use of this information could be, for example, cashier productivity, loss prevention, fraud detection or validation/auditing applications that reconcile data warehouse content with actual P.O.S. logs.

Two main areas are covered: Register events (POS SALES) taking place as part of a Sale (quantity key, price override, etc.), and those Register events (POS NON SALES) taking place independent of a Sales transaction (settlement, logging, etc.).

The detail information in this Subject Area is critical in tracking and identifying exceptions, suspicious or potentially fraudulent activities and for productivity and training plans and issues.

The PRIVACY subject area represents a PARTY's privacy settings for the collection and use of personal data. Privacy, and the control of one's personal data, is rapidly gaining attention in the media and political arena. Consumers are becoming more privacy-assertive; and with the rapid adoption of online privacy for the Web, offline privacy expectations are rising. This subject is represented in FIG. 3 by PRIVACY entity 306.

Privacy data fields are those which pertain to personal data, such as age, gender, income, marital status, or purchase habits; reveal identity, such as name, address, phone number, social security number, bank account number; or "special categories" of data, such as racial or ethnic origin, religious beliefs, etc.

The PROMOTION subject area models the key information necessary to support the tracking and analysis of an enterprise's marketing efforts. It allows the determination of promotional effectiveness by tracking market segments or individuals targeted with promotional offers and the eventual response to the promotion in the form of Sales lift or Coupon redemption. This area also captures the promotion budget, actual promotion expenses and expected or planned sales revenue associated with a given promotion. The PROMOTION subject are is represented by entity 541 in FIG. 3.

The QUALITY FEEDBACK subject area, represented by QUALITY FEEDBACK entity 307 and QUALITY GROUP SURVEY entity 544, provides a view of all aspects of quality feedback tracking present in the Retail Logical Data Model. The primary reason for this subject area and content is to capture feedback received by an enterprise, typically regarding the quality of its products and services, in an effort to analyze and improve the quality of the retailer's products and services.

The RFID/SERIALIZED ITEM TRACKING subject area provides a view of all aspects of Serialized Item tracking present in the model, supporting the use of RFID (Radio Frequency Identification) Technology in the retail industry.

The Subject Area, represented by entities 308, 565 and 266 in FIG. 3, tracks the three different types of movement of Serialized Items: movement to and from suppliers, movement between internal locations, and movement to and from customers.

The SALES (EXTERNAL) subject area, represented by entity 309 in FIG. 3, details sales transactions reported by a third party, possibly from a Trading Partner or Purchased/leased information from a syndication organization such as VNU, IRI, Nielsen, etc. The enterprise is neither the selling nor purchasing party in any of these transactions.

Syndicated information is available at many different aggregation levels, but is typically grouped by MARKET GROUP, shown as entity 510 in FIG. 3, externally defined grouping of organizations that are part of the same sub-industry, such as supermarkets, convenience stores, drugstores, mass merchandisers, warehouse clubs, etc.

External sales information is used by an enterprise to measure market share and performance.

The SALES (INTERNAL) subject area, represented by entity 310 in FIG. 3, captures information concerning the sale and fulfillment of products and services offered by an enterprise. This subject area details what was sold to whom, who paid for it, how paid for, and when, how and by whom it was provided to the customer.

Sales transactions are grouped together at a VISIT level, shown as entity 335 in FIG. 3, defining all the sales related transactions made by a customer during a predefined time period at a given location.

The SHIPPING ORDER subject area, represented by FREIGHT BILL entity 468 in FIG. 3, details the content of a SHIPMENT, the PIECEs, or Handling Units, that make up a Shipment, the actual Items contained therein, the different PARTIES involved, the TRANSPORTATION SERVICES requested, and any potential CLAIMs made against selected Shipment Pieces.

The SHIPPING PLAN Subject Area supports two distinctly different Transportation and Shipping Planning options. The first Planning area allows for the advance route, rate, carrier, service, and cost planning of every single (or select) Shipment. The second Planning area covers a global 'goal setting' capability.

The SHIPPING REGULATION subject area, represented by CUSTOMS REQUIREMENT entity 449, specifies the rules and regulations of transporting goods over borders. As part of the critical information that this subject area supports, it specifically defines the official information required to be presented to the Controlling Authority.

The SHIPPING TRANSPORT subject area, represented by ASSET entity 416, and LEG EQUIPMENT entity 503 details the actual transporting of a Shipment, including all tracking information, transport mode(s) used, legs and routes traveled and the Equipment utilized.

The TIME PERIOD subject area, not shown, can be used to map country-specific holidays and events, climate and sales seasons. Additionally, it can be used to map into an enterprise's accounting and fiscal time periods.

The VENDOR (SUPPLIER) subject area, represented by entity VENDOR entity 619 in FIG. 3, captures information concerning the type of ORGANIZATION that supplies ITEMs to a retail company. This area models purchase orders made to the VENDOR and receipt of items in return.

The WEB OPERATIONS subject area models web server activity and web visit interactions. The central entity within the WEB OPERATIONS subject area is the WEB SERVER entity, identified by reference numeral 622 in FIG. 3. This subject area also models other areas associated with web site services. Such information as server capacity, software and activity provide for monitoring and maintenance are tracked.

All key aspects of an enterprise's web site(s); e.g., the content, intent, multimedia components, advertising, page navigation, etc.; are represented in the WEB SITE subject area. The WEB SITE subject area is represented in the conceptual model of FIG. 3 by WEB SITE entity 623 and WEB STORE entity 624.

The WEB VISIT subject area is represented by REFERRAL entity 551 and WEB PAGE VIEW entity 621 in FIG. 3. This subject area stores information about web visitors, visitor web activity and browsing history, and referrals.

More detailed information concerning the above described subject areas is available in Provisional Application Serial Number 61/003,191, entitled "TERADATA RETAIL LOGICAL DATA MODEL 5.01," filed on Nov. 14, 2007.

Quality Feedback Subject Area

The QUALITY FEEDBACK subject area, illustrated in FIGS. 4A through 4F, provides a view of all aspects of quality feedback tracking present in the Retail Logical Data Model.

As stated above, the primary reason for creating this subject area and content is to capture feedback received by the enterprise, typically regarding the quality of it products and services, in an effort to analyze and improve the quality of the retailer's products and services.

Feedback can be planned, such as by contracting a third party to contact individuals and solicit feedback, or the enterprise performing periodic inspections and "mystery shopper" activities conducted by the enterprise. Feedback can also be spontaneous, such as when consumers contact the enterprise. The type of feedback can be free format, such as a customer call or email, or structured as in surveys.

The entities of the QUALITY FEEDBACK subject area, illustrated in FIGS. 4A through 4F, are defined as follows:

AGREEMENT (411) Defines the specific AGREEMENT with a specific PARTY relative to prices, terms and conditions. Examples include the terms between a Third PARTY and an enterprise as it relates to the pricing of products and services.

ASSOCIATE (417) An individual who works under the direct control of the enterprise such as Employees, Contractors, Temporary Workers, etc.

COMPENSATORY OFFER (434) An Offer (or Offers) made to a customer as compensation for feedback received. This could be to reward the customer for taking the time to provide feedback, or to compensate the customer for a less than perfect experience with the enterprise.

CONTRACTED FEEDBACK (438) Feedback collected by a contracted third Party on behalf of the enterprise.

CORPORATE FEEDBACK (439) Feedback collected by the enterprise in a pro-active manner (customers or individuals contacted by the enterprise, instead of the other way around). Examples include: enterprise pro-actively surveys customers, and a "mystery shopper" activity (associates pretending to be customers).

CUSTOMER FEEDBACK (445) Feedback received directly from a customer, where the customer or individual contacted the enterprise. Feedback can be regarding an existing order, agreement, shipment, etc. Examples include: customer informs enterprise that they can get better terms from a competitor, customer called the enterprise after a visit or product order, and customer completed a survey form available in an enterprise location. If needed, individual subtype entities can be created for each type of business transaction feedback or contact that is collected (Agreements, Sales, Orders, Shipments, etc.) FEEDBACK CLASS (461) This entity allows for a more specific classification of unstructured feedback received, within a specific feedback type. Examples for products include product safety and product quality. Examples for services include service speed and service friendliness.

FEEDBACK DETAIL (462) Specifies the particulars provided in an unstructured feedback event, and also captures the Item or Associate involved (if applicable).

FEEDBACK RESPONSE (463) A brief description of the response type used to resolve a specific individual Customer Feedback. Examples of feedback types include: provided a discount, made available a promotional offer, provided loyalty points, credited customer account, etc.

FEEDBACK TYPE (464) An entity that can be used to organize or group unstructured feedback at a high level. Possible Examples: product related, service related, staff related, store related, etc.

FEEDBACK (465) A specific instance of feedback received by the enterprise (typically regarding the quality of its products and services). The feedback can be planned, such as: contracting a third party to solicit feedback, or periodic inspections and 'mystery shopper' activities conducted by the enterprise. The feedback can also be spontaneous, e.g., customers contacting the enterprise. The type of feedback can be free format, or structured (as in surveys).

ITEM (500) An ITEM is the lowest level for which inventory and sales records are retained within the enterprise. A unique identifier for a grouping of one or more products or services and the corresponding price plan, rate structure or unit charge that may marketed by the organization for the purpose of generating revenue. An item is what a customer purchases or subscribes to. Examples include: Parker Elite fountain pen in silver, Campbell's Hearty Tomato Soup 4 oz can, Photo Printing Service, Overnight Transportation Service, Accessorial Service, etc.

MARKET SEGMENT (511) A grouping of PARTYs for marketing or analysis purposes. A MARKET SEGMENT can be re-used, can receive multiple offers, serve as a control group, or be used for customer & product analysis purposes.

PARTY SEGMENT (522) An associative entity that maps a PARTY into a MARKET SEGMENT. A PARTY can be a member of multiple MARKET SEGMENTs, and vice versa.

PARTY (524) A party is any individual, organization or household that is of interest to the enterprise.

PROMO OFFER (540) A specific incentive made available to customers. Usually contains two parts: a.) condition(s) to be met, and b.) the reward for a.) It is usually a narrowly defined marketing effort designed for a specific purpose. Can be part of a larger campaign. It has a specific start and end date. A promotion can contain multiple promo offers and ads. Example: Buy a DELL Desk top Computer, and get a free Epson 760 printer.

QUALITY GROUP SURVEY (544) Defines an activity that was conducted to solicit feedback from a group of customers regarding the products and services of the enterprise. Often done with a specifically targeted market segment. Example: a Market Research Group is hired to obtain feedback from customers. This can be done via polling (by phone), in-person focus groups, etc. The results reported could be structured (conforming to a survey format) or free-form (unstructured).

QUALITY RESOLUTION (545) Defines a Global Quality related action taken to resolve or address feedback received. This is a global action, as opposed to the Feedback Response entity that captures the response to an individual Party's feedback instead. Examples: improve associate training, or improve item quality inspections.

QUALITY SURVEY QUESTION (546) Details the specific questions contained in the Quality Survey.

QUALITY SURVEY (547) A Specific pre-defined formal, controlled, or structured set of questions where specific responses are solicited, and responses (typically) are constrained to selecting one of several choices presented.

SALES TRANSACTION (561) A single CUSTOMER interaction or transaction involving the potential or actual Sale or Return of one or more ITEMs. It is very open ended, and can be used to describe any aggregation of ITEMS made by a (potential) customer. For example, this entity can represent Web Shopping Cart, Web Wish-list, Wedding Registry List, Store P.O.S. Sale, Store Layaway Purchase, Catalog Order, etc. It does not always represent an ACTUAL sale.

SURVEY FEEDBACK (587) Feedback received in a formal, controlled, or structured format, where specific responses are solicited, and responses (typically) are constrained to selecting one of several choices presented.

SURVEY QUESTION RESPONSE (588) Feedback response to a specific item or question on a survey.

TRAIT GROUP (590) A cluster of related TRAITs. Examples: for Item: 'Size' could be a TRAIT GROUP, with each of the dimensions (height, width, depth) being a separate TRAIT; for Service Quality: associate rating, accuracy rating, expense rating, etc.; for RFID Trait Scan: handling, environmental, etc.

TRAIT VALUE (591) The actual value describing the specific TRAIT of a specific object. Examples: for Item Traits: color='blue', suitable age rating='12 years and older'; for Ser Item Trait: expiration date=4/2009; for RFID Trait Scans: ambient temperature high=40 degrees Celsius; and for Quality Feedback Detail: service=slow; associate=very professional.

TRAIT (592) Describes a trait of an object, service, experience, etc. This structure is typically used where objects can have a wide number of dynamic descriptive attributes, and/or new ones are continuously encountered. In this case, a generic structure as defined by the Trait structure may be more appropriate than discrete attributes. Example: for Item, it could be: color, height, suitable age rating, etc.; For Ser Item Trait: expiration date, batch number, quality inspector id, etc.; For RFID Trait Scans: ambient temperature, shock, pressure, etc.; for Quality Feedback Detail: service speed, associate friendliness, etc. In environments where objects are homogenous, discrete attributes would be recommended, e.g.: in the case of a dedicated Bookseller.

UNSTRUCTURED FEEDBACK (613) The Unstructured Feedback structure captures 'non-formal' feedback that is typically difficult to encode (as opposed to 'formal' interactions, such as orders, payments, etc.). This type of feedback is typically 'free form' (phone conversations, letters, etc.). Attributes are provided to enable summary representative standard codes to describe the essence of the contact to make analysis possible.

A listing of all the attributes included within the entities shown in FIGS. 4A through 4F, together with a brief description of each attribute, is provided in Appendix A.

CONCLUSION

The Figures and description of the invention provided above reveal a flexible relational data model for a retail enterprise data warehouse solution. The data model design enables the capturing of quality feedback information for products and services sold by the retail enterprise. Maintaining this information in a data warehouse provides the retail enterprise with the ability to analyze and improve supply chain operations, to better manage store inventory, and more efficiently manage product sales and returns.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX A

Attribute Definitions

| Entity Name | Attribute Name | Attribute Definition | PK | FK |
|---|---|---|---|---|
| AGREEMENT | Agreement End Dt | This attribute is the calendar day on which a legal agreement ceases to be effective. | | |
| | Agreement Id | Uniquely identifies an AGREEMENT. | Yes | |
| | Agreement Name | This attribute is a name or title assigned to the agreement by the enterprise. | No | |
| | Agreement Start Dt | This attribute is the calendar day on which a legal agreement becomes effective. | | |
| | Agreement Type Cd | Uniquely identifies the AGREEMENT TYPE. | | Yes |
| | Replacement Agreement Id | Uniquely identifies an AGREEMENT. Identifies the Agreement that replaces or supersedes this Agreement. | | |
| ASSOCIATE | Assoc Hire Dt | The date on which the associate was hired. | | |
| | Assoc HR Num | The number that was assigned to the ASSOCIATE by the enterprises HR Department. | | |
| | Assoc Termination Dt | The date the associate was terminated from employment. | | |
| | Associate Party Id | An individual who is employed by the enterprise. | Yes | Yes |
| | Location Id | Uniquely identifies a LOCATION. The associates primary location of work. | No | |
| | Manager Associate Id | An individual who is employed by the enterprise. The associates manager. | | |
| | Position Id | Unique identifier for an ASSOCIATE POSITION. | | |
| COMPENSATORY OFFER | Compensation Seq Num | Uniquely identifies a Compensatory Offer in response to a specific Feedback instance. | Yes | |
| | Feedback Id | Uniquely identifies an instance of Quality Feedback. Typically system assigned. | | Yes |

APPENDIX A-continued

Attribute Definitions

| Entity Name | Attribute Name | Attribute Definition | PK | FK |
|---|---|---|---|---|
| | Promo Offer Id | The unique identifier for a promo offer. The Offer provided as compensation. | No | |
| CONTRACTED FEEDBACK | Feedback Id | Uniquely identifies an instance of Quality Feedback. Typically system assigned. | Yes | Yes |
| CORPORATE FEEDBACK | Feedback Id | Uniquely identifies an instance of Quality Feedback. Typically system assigned. | Yes | |
| | Scheduled Ind | Indicates if the feedback was obtained via a scheduled (like a monthly inspection) event, or unscheduled (like a mystery shopper or surprise inspection) event. | No | No |
| COST | Cost Cd | Uniquely identifies a COST. | | No |
| | Cost Desc | Narrative text describing the COST. | No | |
| | Cost Type Cd | Uniquely identifies a COST TYPE. | | Yes |
| COST TYPE | Cost Type Cd | Uniquely identifies a COST TYPE. | | No |
| | Cost Type Desc | Narrative text describing the Cost Type. | No | |
| COUNTRY | Country Cd | The unique code for an instance of the COUNTRY entity. | Yes | |
| | Country Group Cd | The unique code assigned to the COUNTRY GROUP. | No | Yes |
| | Country Name | The name of a COUNTRY | | No |
| CREW MEMBER | Associate Party Id | An individual who is employed by the enterprise. The individual(s) that are operating (driving, flying, etc.) the transportation equipment. | Yes | Yes |
| CUSTOMER FEEDBACK | Agreement Id | Uniquely identifies an AGREEMENT. The Agreement that prompted the feedback (if applicable). | No | |
| | Feedback Id | Uniquely identifies an instance of Quality Feedback. Typically system assigned. | Yes | |
| | Feedback Response Cd | Uniquely identifies a FEEDBACK RESPONSE. | No | |
| | Sales Tran Id | Unique identifier for a SALES TRANSACTION. The Sales Transaction that prompted the feedback (if applicable). | | |
| FEEDBACK | Event Dttm | The date and time of the event that is being reported on (if applicable). Example: "I visited your store on this date and time, and the restrooms were dirty" | No | No |
| | Event Resolution Dt | The date that an action was taken to resolve the feedback. | | |
| | Feedback Id | Uniquely identifies an instance of Quality Feedback. Typically system assigned. | Yes | |
| | Group Survey Id | Uniquely identifies a Quality Group Event. Used of the feedback was solicited during a Quality Group Event. | No | Yes |
| | Location Id | Uniquely identifies a LOCATION. The location that is the subject of the feedback (or where the feedback occurred), if applicable | | |
| | Quality Resolution Cd | Uniquely identifies a Quality Resolution. | | |
| | Reporting Dttm | The date and time the feedback was reported. | | No |
| | Reporting Party Id | The unique identifier for any individual or group of individuals that is of interest to the enterprise. The Party that is providing the feedback (if known). | | Yes |
| FEEDBACK CLASS | Feedback Class Cd | Uniquely identifies a Feedback Class. | Yes | No |
| | Feedback Class Desc | Narrative text describing the Feedback Class. | No | |
| | Feedback Type Cd | Uniquely identifies a Feedback Type. | Yes | Yes |

APPENDIX A-continued

Attribute Definitions

| Entity Name | Attribute Name | Attribute Definition | PK | FK |
|---|---|---|---|---|
| FEEDBACK DETAIL | Associate Party Id | An individual who is employed by the enterprise.<br>The associate that prompted the feedback provided (if applicable). | No | |
| | Feedback Id | Uniquely identifies an instance of Quality Feedback. Typically system assigned. | Yes | |
| | Feedback Verbose Txt | The actual feedback comments received.<br>This could be the actual contents of a customer letter, or a synopsis of a telephone call received.<br>Note: Not very useful for data mining, but helpful in resolving individual customer issues. | No | No |
| | Item Id | Uniquely identifies an item. Typically system assigned.<br>The Item or Service that prompted, or is related to the feedback. | | Yes |
| | Quality Event Seq Num | Uniquely identifies a specific detail item of feedback. | Yes | No |
| | Quality Rating Num | The response to a feedback item expressed as a number.<br>Example:<br>rated 'friendliness of staff' as a 3 out of 5 | No | |
| | Quality Rating Txt | The response to a feedback item expressed in text format.<br>Example:<br>qualified service as "slow" or "bad" | | |
| | Trait Cd | Uniquely identifies a TRAIT. | | Yes |
| | Trait Value Cd | Unique identifier for a TRAIT VALUE.<br>The trait or characteristic that feedback was provided about.<br>The Trait attributes are needed if the survey questions are more specific than can be provided for by the broad feedback class attributes. | | |
| FEEDBACK RESPONSE | Feedback Response Cd | Uniquely identifies a FEEDBACK RESPONSE. | Yes | No |
| | Feedback Response Desc | Narrative text describing the FEEDBACK RESPONSE. | No | |
| FEEDBACK TYPE | Feedback Type Cd | Uniquely identifies a Feedback Type. | Yes | |
| | Feedback Type Desc | Narrative text describing the Feedback Type. | No | |
| ITEM | Brand Cd | Uniquely identifies a BRAND. | No | Yes |
| | Commodity Cd | Uniquely identifies a commodity using a Classification Standard. | | |
| | Franchise Cd | Uniquely identifies a FRANCHISE. | | |
| | Inventory Item Ind | Indicates if the item is physically inventoried.<br>Example:<br>Some items that are NOT inventoried would be: electronic download items, menu items (food industry), service items, etc.<br>Note: If there is a requirement to capture several attributes that pertain ONLY to these kinds of Items, a separate Item Subtype should be created to house them. | | No |
| | Item Class Cd | Uniquely identifies an ITEM CLASS. | | Yes |
| | Item Desc | Narrative text describing the ITEM. | | No |
| | Item Id | Uniquely identifies an item. Typically system assigned. | Yes | |
| | Item Name | Short text reference or label for an ITEM. | No | |
| | Item SKU Num | An identification number (Stock Keeping Unit) often used to identify ITEMs. Since it is frequently not unique, or ambiguous it is not used as PK, but is kept as a convenience.<br>Note: if SKU is unique in your environment, it can be used as the PK, instead of Item Id. | | |

APPENDIX A-continued

Attribute Definitions

| Entity Name | Attribute Name | Attribute Definition | PK | FK |
|---|---|---|---|---|
| | Item Subclass Cd | Uniquely identifies an ITEM SUBCLASS. | | Yes |
| | Item Type Cd | Uniquely identifies the Item subtype. | | |
| | Multi Item Ind | Indicates that an Item is a Multi Item or not. Example: "Yes" -item is a Multi Item "No"-item is not a Multi Item. | | No |
| | Owner Party Id | The unique identifier for any individual or group of individuals that is of interest to the enterprise. The "Owner" of the Item Id. Used when External Organizations ITEMs need to be represented. These Items are typically not under direct control of the Enterprise. This external ownership can also be implemented with this attribute as part of the PK to allow for the reuse of an Item Id. Note: There are essentially two different types of Items: Items that are identical (and often identified in a standard way (UPC, GTIN)), but sold by many 3rd Parties (Consumer Electronics, Pharmaceuticals, etc.) Items that are unique to a specific Party and not widely/typically resold by 3rd Parties (FedEx Ground Transportation Service, etc.) | | Yes |
| | Pricing UOM Cd | The pricing unit of measure that applies to this item. Example: A bottle of Coke has a pricing unit of measure of "Each" or "Apiece." Ground Coffee is sold by the "Pound" or "Kilogram." Bolts of cloth are sold by the "Yard", etc. Note: This measure is different from an ITEM TRAIT. For the bottle of coke example above, a trait might show a "Size" of 1 liter, etc., while the price is set per bottle. If the enterprise only sells items by the piece (for example a book store) then this entity may be omitted from the model. | | |
| | Salable Item Ind | An item that can be sold to a customer. Could be physical, virtual, or a service. This is typically the "Products" offered for sale by the Enterprise. Examples of items that are NOT salable to customers would be: For a Retailer: bulk items (pallet/ carton level-this is the level at which it is usually acquired form suppliers). for a Distributor: Consumer level retail items (the bulk packaging of the same would be Salable). parts, components, or ingredients used to make Salable Items items acquired for internal use only. Note: If there is a requirement to capture several attributes that pertain ONLY to these kinds of Items, a separate Item Subtype should be created to house them. | | No |
| | Service Item Ind | Work performed by the enterprise (or on behalf of the enterprise) for a fee for the benefit of a customer- typically referred to as "providing a service" to a customer. | | |

APPENDIX A-continued

Attribute Definitions

| Entity Name | Attribute Name | Attribute Definition | PK | FK |
|---|---|---|---|---|
| | | Example: Installation of a new PC, Transportation Service, Carpet cleaning, Repair Service, etc. Note: If there is a requirement to capture several attributes that pertain ONLY to these kinds of Items, a separate Item Subtype should be created to house them. | | |
| | Vendor Party Id | The unique identifier for an organization. Indicates the Organization that is the primary marketer and seller of the item. Often the same Organization as the manufacturer. Example: The brand "7 Up" is primary marketed and sold (and also manufactured) by the Coca Cola Company. Note: The enterprise must decide what level of meaningful information to source this attribute with. In the soft drink example above it is useful, as well as in the case of pharmacy items where the Vendor and the manufacturer are typically the same company. It would typically not be used to list 'actual' manufacturer for items such as toys (where well known brands like Fisher Price products are typically manufactured by Chinese companies that the Enterprise would never have to deal with directly or use for analytical decision making processes.) Another way to look at this attribute is to consider it to be the Vendor of the item (which may or may not be the same as the Supplier of the item, since the item may be supplied by a distributor instead of the Vendor) | | Yes |
| MARKET SEGMENT | Model Id | The unique identifier for an instance of the ANALYTICAL MODEL entity. | No | |
| | Model Run Id | An identifier that uniquely describes this particular run of the ANALYTICAL MODEL. | | |
| | Segment Desc | Text that describes an instance of the MARKET SEGMENT entity. | | No |
| | Segment Dttm | The date and time on which a SEGMENT was generated. | | |
| | Segment Group Id | The unique identifier for an instance of the MARKET SEGMENT GROUP entity. | | Yes |
| | Segment Id | The unique identifier for an instance of the MARKET SEGMENT entity. | Yes | No |
| PARTY | Credit Rating Cd | Uniquely identifies a CREDIT RATING. | | Yes |
| | Party First Purchase Dt | The date the party first purchased a product or service. This attribute will only be needed if all purchase history is not retained. | | No |
| | Party Id | The unique identifier for any individual or group of individuals that is of interest to the enterprise. | Yes | |
| | Party Info Source Type Cd | A code used to uniquely identify how/where the first information about the existence of a Party was obtained. | No | Yes |
| | Party Start Dt | The date this party first became of interest to the enterprise. | | No |
| | Party Type Cd | A code used to uniquely identify the sub-type discriminator for a party. Valid sub-type occurrences are INDIVIDUAL, ORGANIZATION and HOUSEHOLD. | | Yes |

APPENDIX A-continued

Attribute Definitions

| Entity Name | Attribute Name | Attribute Definition | PK | FK |
|---|---|---|---|---|
| PARTY SEGMENT | Party Id | The unique identifier for any individual or group of individuals that is of interest to the enterprise. | Yes | Yes |
| | Segment Id | The unique identifier for an instance of the MARKET SEGMENT entity. | | |
| PROMO OFFER | Ad Id | The unique identifier for an ad. | No | |
| | Item Offer Ind | Indicates if the Offer references specific Items. Example: NON ITEM OFFER: Provides an incentive to a customer, without specifying any items or products. Example: Temporary reduced rates provided a certain level of business is transacted. ITEM OFFER: Involves a specific item (product or service) or group of items (or any higher level grouping of items) Example: Order item x during the next week and get 10% discount. | | No |
| | Promo Id | The unique identifier for the promotion. | | Yes |
| | Promo Offer Desc | The description for a promo offer. | | No |
| | Promo Offer Id | The unique identifier for a promo offer. | Yes | |
| | Promo Offer Type Cd | The code assigned to the offer type. | No | Yes |
| QUALITY GROUP SURVEY | Group Survey Id | Uniquely identifies a Quality Group Survey. | | No |
| | Quality Resolution Cd | The Quality Resolution adopted as a result of the Group Survey. Note: If multiple Resolutions are to be supported, create an associative entity instead. | No | Yes |
| | Segment Id | The unique identifier for an instance of the MARKET SEGMENT entity. The Market Segmented targeted or selected for feedback. | | |
| | Survey Conducted End Dt | The date the feedback collection event ended. | | No |
| | Survey Conducted Start Dt | The date the feedback collection event started. | | |
| | Survey Desc | Narrative text describing the Quality Group Survey. | | |
| | Survey Id | Uniquely identifies a Quality Survey. The Survey questionnaire used. Optional. | | Yes |
| QUALITY RESOLUTION | Quality Resolution Cd | Uniquely identifies a Quality Resolution. | Yes | No |
| | Quality Resolution Desc | Narrative text describing the Quality Resolution. | No | |
| QUALITY SURVEY | Survey Desc | Narrative text describing the Quality Survey. | | |
| | Survey Id | Uniquely identifies a Quality Survey. | Yes | |
| QUALITY SURVEY QUESTION | Feedback Class Cd | Uniquely identifies a Feedback Class. | No | Yes |
| | Feedback Type Cd | Uniquely identifies a Feedback Type. | | |
| | Survey Id | Uniquely identifies a Quality Survey. | Yes | |
| | Survey Line Num | Uniquely identifies a specific survey item or question on a survey. | | No |
| | Survey Question Txt | The actual text of the Survey Question asked. | No | |
| | Trait Cd | Uniquely identifies a TRAIT. The trait or characteristic being surveyed. The Trait attributes are needed if the survey questions are more specific than can be provided for by the broad feedback class attributes. | | Yes |
| | Trait Value Cd | Unique identifier for a Trait Value. The value of the trait or characteristic being surveyed. | | |

APPENDIX A-continued

Attribute Definitions

| Entity Name | Attribute Name | Attribute Definition | PK | FK |
|---|---|---|---|---|
| SALES TRANSACTION | Bill To Address Id | A number used to uniquely identify an ADDRESS. The bill is sent to this address. | | No |
| | Bill To Persona Id | Unique identifies an instance of a PERSONA. The person who receives the bill. | | |
| | Customer PO Id | Reference to the Customer's Purchase Order number (if applicable). | | No |
| | Order Num | The order number assigned to this sales transaction. Used for external communication and Order Tracking for sales transactions where there is a delay between the sale and the fulfillment. It is typically used to provide linkage to legacy Order Systems. In some environments may be identical to Sales Tran Id (in which case it can be omitted). | | |
| | POS Register Id | Unique identifier for the POS REGISTER. | | Yes |
| | Related Sales Tran Id | The unique identifier of the instance of the SALES TRANSACTION entity that is related to this instance. It can be used to relate two SALES TRANSACTIONS, e.g.: when an order was cancelled, and replaced by a new order, or when a web shopping cart was replaced by an actual order, or where one SALES TRANSACTION represents a Gift Registry, and is related to multiple purchase SALES TRANSACTIONs of guests buying from the registry. | | |
| | Reported As Dttm | The accounting date for this SALES TRANSACTION. | | No |
| | Sales Associate Id | An individual who is employed by the enterprise. The ASSOCIATE responsible for making the sale-a Checkout Clerk, Customer Service Representative (Call Center or other), etc. | | Yes |
| | Sales Tran Id | Unique identifier for a SALES TRANSACTION. | Yes | No |
| | Ship To Address Id | A number used to uniquely identify an ADDRESS. Products are shipped to this address. | No | Yes |
| | Ship To Persona Id | Unique identifies an instance of a PERSONA. Products are shipped in care of this person. | | |
| | Tran End Dttm DD | The date and time a SALES TRANSACTION ended-the last moment data was entered, e.g., a key-press on POS terminal or data entry on a web site form, etc.) This may be the end of the tender process. Derived from the latest or last SALES TRANSACTION LINE or RETURN TRANSACTION LINE end date or PAYMENT LINE date and time for this transaction. | | No |
| | Tran Start Dttm DD | The date and time a SALES TRANSACTION began (first moment data was entered, e.g., a key-press on POS terminal or data entry on a web site form, etc.) Derived from the earliest SALES TRANSACTION LINE or RETURN TRANSACTION LINE start date and time for this transaction. | | |
| | Tran Status Cd | Unique identifier for a TRANSACTION STATUS. | | Yes |

APPENDIX A-continued

Attribute Definitions

| Entity Name | Attribute Name | Attribute Definition | PK | FK |
|---|---|---|---|---|
| | Tran Type Cd | Uniquely identifies the transaction type. | | |
| | Visit Id | Unique identifier for the VISIT. | | |
| SURVEY FEEDBACK | Feedback Id | Uniquely identifies an instance of Quality Feedback. Typically system assigned. | Yes | Yes |
| | Survey Id | Uniquely identifies a Quality Survey. | No | |
| SURVEY QUESTION RESPONSE | Feedback Id | Uniquely identifies an instance of Quality Feedback. Typically system assigned. | Yes | |
| | Quality Rating Num | The response to a survey item expressed as a number. Example: rated 'friendliness of staff' as a 3 out of 5 used to select desired response to a 'multiple choice' prompt | No | No |
| | Quality Rating Txt | The response to a survey item expressed in text format. Example: response to "how can we best improve our service?" | | |
| | Survey Id | Uniquely identifies a Quality Survey. | Yes | Yes |
| | Survey Line Num | Uniquely identifies a specific survey item or question on a survey. | | |
| TRAIT | Trait Cd | Uniquely identifies a TRAIT. | Yes | |
| | Trait Desc | Narrative text describing the TRAIT. | No | |
| | Trait Group Cd | Uniquely identifies a TRAIT GROUP. | | Yes |
| TRAIT GROUP | | | Yes | No |
| | Trait Group Desc | Narrative text describing the TRAIT GROUP. | No | |
| TRAIT VALUE | Trait Cd | Uniquely identifies a TRAIT. | Yes | Yes |
| | Trait Val | The amount or quantity describing a TRAIT VALUE. | No | No |
| | Trait Value Cd | Unique identifier for a TRAIT VALUE. | Yes | |
| | Trait Value Desc | Narrative text describing the TRAIT VALUE. | No | |
| | Trait Value UOM Cd | Uniquely identifies a unit of measure. Applies only to the Trait Val if that attribute is populated and if it is appropriate. Example: waist size of 34 measured in inches. | | Yes |
| UNSTRUCTURED FEEDBACK | Feedback Class Cd | Uniquely identifies a Feedback Class. | | Yes |
| | Feedback Id | Uniquely identifies an instance of Quality Feedback. Typically system assigned. | Yes | |
| | Feedback Type Cd | Uniquely identifies a Feedback Type. | No | |

What is claimed is:

1. A relational database system for storing and managing feedback information for a retail enterprise, said relational database system comprising:
   a data warehouse;
   an application server in communication with said data warehouse, said application server containing at least one application for accessing feedback information associated with products sold by said retail enterprise supply contained within said data warehouse;
   at least one client workstation in communication with said application server, said client workstation providing a user access to said at least one application contained in said application server;
   a relational database for storing and organizing said feedback information associated with products sold by said retail enterprise supply within said data warehouse;
   a logical data model comprising a plurality of entities and relationships defining how said feedback information associated with products sold by said retail enterprise is stored and organized within a relational database.

2. The relational database system in accordance with claim 1, wherein said feedback information comprises at least one information type selected from the group consisting of:
   feedback information collected by a contracted third party on behalf of the enterprise;
   feedback information collected by the enterprise in a proactive manner; and
   feedback information received directly from a customer, where the customer contacted the enterprise.

3. The relational database system in accordance with claim 1, wherein said feedback information includes:
   a feedback item concerning a specific customer; and
   a description of a response used to resolve said feedback item.

4. The relational database system in accordance with claim 1, wherein said feedback information includes:
   feedback items concerning a plurality of customers; and
   a description of a global action taken to resolve a plurality of said feedback items.

5. The relational database system in accordance with claim 1, wherein said feedback information includes:

feedback information obtained in response to questions contained in a quality survey.

6. The relational database system in accordance with claim 1, wherein said feedback information includes unstructured feedback information.

7. A method for storing and managing feedback information for a retail enterprise, said method comprising the steps of:
- establishing a relational database, implemented within a data awarehouse, for storing and organizing said feedback information associated with products sold by said retail enterprise;
- establishing a logical data model including a plurality of entities and relationships defining how said feedback information is stored and organized within said relational database;
- populating said relational database with said feedback information in accordance with said logical data model;
- providing an application server in communication with said data warehouse, said application server containing at least one application for accessing said feedback information contained within said data warehouse; and
- providing at least one client workstation in communication with said application server, said client workstation providing a user access to said at least one application contained in said application server.

8. The method in accordance with claim 7, wherein said information comprises at least one information type selected from the group consisting of:
- feedback information collected by a contracted third party on behalf of the enterprise;
- feedback information collected by the enterprise in a proactive manner; and
- feedback information received directly from a customer, where the customer contacted the enterprise.

9. The method in accordance with claim 7, wherein said feedback information includes:
- a feedback item concerning a specific customer; and
- a description of a response used to resolve said feedback item.

10. The method in accordance with claim 7, wherein said feedback information includes:
- feedback items concerning a plurality of customers; and
- a description of a global action taken to resolve a plurality of said feedback items.

11. The method in accordance with claim 7, wherein said feedback information includes:
- feedback information obtained in response to questions contained in a quality survey.

12. The method in accordance with claim 7, wherein said feedback information includes unstructured feedback information.

* * * * *